United States Patent
Pragya et al.

(10) Patent No.: US 10,496,379 B2
(45) Date of Patent: Dec. 3, 2019

(54) FACILITATED PRODUCTION OF CODE FOR SOFTWARE TESTING

(71) Applicant: SAP SE, Walldorf (DE)

(72) Inventors: Pragya, Gurugram (IN); Parul Batra Chopra, Gurugram (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/891,185

(22) Filed: Feb. 7, 2018

(65) Prior Publication Data

US 2019/0243613 A1    Aug. 8, 2019

(51) Int. Cl.
G06F 9/44    (2018.01)
G06F 9/445    (2018.01)
G06F 8/33    (2018.01)
G06F 3/0484    (2013.01)
G06F 11/36    (2006.01)

(52) U.S. Cl.
CPC ............ *G06F 8/33* (2013.01); *G06F 3/04842* (2013.01); *G06F 11/3684* (2013.01)

(58) Field of Classification Search
CPC ..... G06F 8/33; G06F 3/04842; G06F 11/3684
See application file for complete search history.

(56) References Cited

U.S. PATENT DOCUMENTS

| | | | |
|---|---|---|---|
| 7,219,279 B2 | 5/2007 | Chandra et al. | |
| 7,587,636 B2 | 9/2009 | Tillmann et al. | |
| 8,127,275 B1 | 2/2012 | Hampapuram et al. | |
| 8,566,794 B2 | 10/2013 | Rossi et al. | |
| 8,578,336 B1 * | 11/2013 | Wiradarma | G06F 11/3684 717/125 |
| 9,009,682 B2 | 4/2015 | Tsantilis et al. | |
| 9,189,317 B1 * | 11/2015 | Marimuthu | G06F 11/366 |
| 9,430,194 B1 * | 8/2016 | Childs | G06F 8/34 |
| 9,507,698 B2 * | 11/2016 | Vikutan | G06F 11/3684 |
| 10,120,656 B1 * | 11/2018 | Singh | G06F 8/33 |
| 10,146,673 B2 * | 12/2018 | Koren | G06F 11/3688 |
| 2003/0041315 A1 | 2/2003 | Bates et al. | |
| 2004/0015910 A1 * | 1/2004 | Tonouchi | G06F 8/427 717/143 |

(Continued)

OTHER PUBLICATIONS

Naimesh Patel, ABAP Unit Test Class Wizard, 2014, p. 1-7. http://zevolving.com/2014/07/abap-unit-test-class-wizard/ (Year: 2014).*

(Continued)

*Primary Examiner* — Mongbao Nguyen
(74) *Attorney, Agent, or Firm* — Klarquist Sparkman, LLP

(57) ABSTRACT

Techniques and solutions are described for automatically creating test code from production code. The production code can include one or more test code identifiers, such as of code checkpoints or modifiable code segments, for example, replaceable code segments or redirectable method calls. Using a user interface, such as a wizard, a user can view test code identifiers, select test code identifiers to activate, and optionally supply values, operators, or code to be used in the test code. The generated test code can include a test version of the production code that is separate from the production code. The generated test code can include test methods that include import parameters, export parameters and operators therefor, and other code to be used in tests to be performed using the test version of the production code.

20 Claims, 17 Drawing Sheets

(56) References Cited

U.S. PATENT DOCUMENTS

| | | | |
|---|---|---|---|
| 2006/0036910 A1* | 2/2006 | Fung | G06F 11/3672 714/25 |
| 2008/0115114 A1 | 5/2008 | Palaparthi et al. | |
| 2008/0120602 A1* | 5/2008 | Comstock | G06F 11/3688 717/125 |
| 2009/0199160 A1* | 8/2009 | Vaitheeswaran | G06F 11/3414 717/124 |
| 2010/0017788 A1* | 1/2010 | Bronkhorst | G06F 11/3664 717/125 |
| 2011/0239194 A1* | 9/2011 | Braude | G06F 11/3688 717/124 |
| 2012/0089964 A1* | 4/2012 | Sawano | G06F 11/3684 717/124 |
| 2012/0096438 A1* | 4/2012 | Rossi | G06F 11/3684 717/125 |
| 2012/0167057 A1* | 6/2012 | Schmich | G06F 11/3644 717/130 |
| 2013/0074036 A1* | 3/2013 | Brandt | G06F 8/73 717/113 |
| 2013/0139004 A1* | 5/2013 | Korogi | G06F 11/263 714/32 |
| 2015/0286556 A1* | 10/2015 | Ellis | G06F 11/3684 717/125 |
| 2015/0301806 A1* | 10/2015 | Leon | G06F 8/33 717/113 |
| 2015/0378880 A1* | 12/2015 | Kucharski | G06F 11/3612 717/130 |
| 2016/0147633 A1* | 5/2016 | Yoshida | G06F 11/368 717/124 |
| 2016/0154725 A1* | 6/2016 | Lopian | G06F 11/3624 717/131 |
| 2017/0270030 A1* | 9/2017 | Cai | G06F 11/3664 |
| 2018/0089066 A1* | 3/2018 | Barnett | G06F 11/3684 |
| 2018/0189165 A1* | 7/2018 | Yamada | G06F 11/28 |
| 2018/0276104 A1* | 9/2018 | Calla | G06F 11/366 |

OTHER PUBLICATIONS

YoungSeok Yoon, Supporting Selective Undo in a Code Editor, 2015, pp. 223-232. https://ieeexplore.ieee.org/stamp/stamp.jsp?tp=&arnumber=7194576 (Year: 2015).*

ABAP unit test with setup & teardown methods, 2016, pp. 1-25. https://sapcodes.com/2016/12/24/abap-unit-test-with-setup-teardown-methods/ (Year: 2016).*

Moritz Beller, Developer Testing in the IDE: Patterns, Beliefs, and Behavior, 2016, http://www.gousios.gr/pub/developer-testing-in-IDE.pdf (Year: 2016).*

Cosmin Marsavina, Studying Fine-Grained Co-Evolution Patterns of Production and Test Code, 2014, pp. 1-10. https://ieeexplore.ieee.org/stamp/stamp.jsp?tp=&arnumber=6975653 (Year: 2014).*

"Binding to Object References (Instances)", retrieved from https://help.sap.com/saphelp_scm50/helpdata/en/c3/021959f06111d4b2eb0050dadfb92b/frameset.htm_ on or before Feb. 2018, 10 pp.

Chellappa, V., "Working with Inheritance", retrieved from http://saptechnical.com/Tutorials/OOPS/Inheritance/demo.htm on or before Feb. 2018, 4 pp.

"Comments", retrieved from https://help.sap.com/doc/abapdocu_751_index_htm/7.51/en-US/abencomment.htm on or before Feb. 2018, 2 pp.

Hughes, G., et al. "Extended interface grammars for automated stub generation", Proceeding AFM 2007: Proceedings of the second workshop on Automated formal methods Nov. 6, 2007, 42-50, 10 pp.

"Import Parameters Passed by Reference and Passed by Value", retrieved from http://sapabap-4.blogspot.com/2013/03/import-parameters-passed-by-reference.html on or before Feb. 2018, 8 pp.

Keller, H., "ABAP News for Release 7.50—Test Seams and Test Injections", retrieved from https://blogs.sap.com/2015/10/23/abap-news-for-750-test-seams-and-injections/ on or before Feb. 2018, 21 pp.

Krawcyzk, A., "Creating ABAP unit tests", retrieved from https://blogs.sap.com/2013/04/15/creating-abap-unit-tests-in-eclipse-and-se80/ on or before Feb. 2018, 15 pp.

"Local class and global class types?", retrieved from https://archive.sap.com/discussions/thread/905993 on or before Feb. 2018, 9 pp.

Mehnert, S. "ABAP Unit Testing: Encapsulate Database using a local Classes", retrieved from https://blogs.sap.com/2015/07/13/abap-unit-testing-encapsulate-database-access-in-local-classes/ on or before Feb. 2018, 10 pp.

"Methods of Class CL_ABAP_Unit_Assert", retrieved from https://help.sap.com/doc/ba879a6e2ea04d9bb94c7ccd7cdac446/7.5.6/en-US/49268dc67b6716b4e10000000a42189d.html, on or before Feb. 2018, 3 pp.

Patel, N., "ABAP Unit Test Class Wizard", retrieved from http://zevolving.com/2014/07/abap-unit-test-class-wizard/ on or before Feb. 2018, 12 pp.

Patel, N., "ABAP Unit Test Driven Development—Basic Example", retrieved from http://zevolving.com/2013/04/abap-unit-test-driven-development-basic-example/ on or before Feb. 2018, 5 pp.

Patel, N., "ABAP Unit Test Fixture Methods", retrieved from http://zevolving.com/2013/05/abap-unit-test-fixture-methods/ on or before Feb. 2018, 4 pp.

Patel, N., "When to use Local Class and when not to!", retrieved from http://zevolving.com/2012/01/when-to-use-local-class-and-when-not-to/ on or before Feb. 2018, 5 pp.

"SAP ABAP—Classes", retrieved from http://www.tutorialscampus.com/tutorials/sap-abap/sap-abap-classes.htm on or before Feb. 2018, 16 pp.

"Test-Injection", retrieved from https://help.sap.com/doc/abapdocu_750_index_htm/7.50/en-US/abaptest-injection.htm on or before Feb. 2018, 3 pp.

"Using the ABAP Unit Wizard", retrieved from https://help.sap.com/saphelp_nwpi71/helpdata/en/47/29180dafbd475891697ec0e7bc64e2/frameset.htm on or before Feb. 2018, 2 pp.

Weber, P., "ABAP Unit Test Wizard", retrieved from http://weberpatrick.de/abap-unit-test-wizard/ on or before Feb. 2018, 10 pp.

\* cited by examiner

Initial Code for actual method
method SEARCH_FLIGHTS_ECONOMY. —110
TEST-SEAM fetch_planetype. —112
CALL METHOD ME -> GET_PLANE_TYPE —114
IF ( PLANE_TYPE != NULL) CALL METHOD ME-> GET_SEATS.
end-test-seam. —116
SELECT * from sflight as a  INNER JOIN spfli as b
Loop at lt_flight_all into ls_flight.
IF ( ls_flight-SEATSMAX - ls_flight-SEATSOCC ) GE iv_ticket_count.
* TEST-SPOT check_currency        ls_flight-CURRENCY —124
* TEST-SPOT check_paymentsum       ls_flight-PAYMENTSUM —126
APPEND ls_flight to lt_flight_sel.
ENDIF.
ENDLOOP. —148
* TEST-STUB calculate. —142
CALL METHOD ME->CALCULATE. —140
* End-test-stub. —144
LOOP AT lt_flight_sel ASSIGNING <fs_flight>.
IF <fs_flight> is ASSIGNED.
<fs_flight>-price = <fs_flight>-price - ( <fs_flight>-price * lv_discount / 100 ).
ENDIF.
* TEST-SPOT final_table —128       lt_flight_sel
et_sflight = lt_flight_sel.
ENDLOOP.
endmethod.

Test Code generated in Global Class
method SEARCH_FLIGHTS_ECONOMY. —110
TEST-SEAM fetch_planetype. —114
PLANE_TYPE = '747'.
SEAT = 120; —120
end-test-seam. —116
SELECT * from sflight as a  INNER JOIN spfli as b
Loop at lt_flight_all into ls_flight.
IF ( ls_flight-SEATSMAX - ls_flight-SEATSOCC ) GE iv_ticket_count.
* TEST-SPOT check_currency        ls_flight-CURRENCY
cl_abap_unit_assert=>ASSERT_EQUALS( act = ls_flight-CURRENCY
exp = 'USD' —130
msg = 'Invalid currency' ).
* TEST-SPOT check_paymentsum —126    ls_flight-PAYMENTSUM
APPEND ls_flight to lt_flight_sel.
ENDIF.
ENDLOOP.
* TEST-STUB calculate. —142
CALL METHOD ME->STUB_CALCULATE. —150
* End-test-stub. —144
LOOP AT lt_flight_sel ASSIGNING <fs_flight>.
IF <fs_flight> is ASSIGNED.
<fs_flight>-price = <fs_flight>-price - ( <fs_flight>-price * lv_discount / 100 ).
ENDIF.
* TEST-SPOT final_table —128       lt_flight_sel
et_sflight = lt_flight_sel.
ENDLOOP.
endmethod.

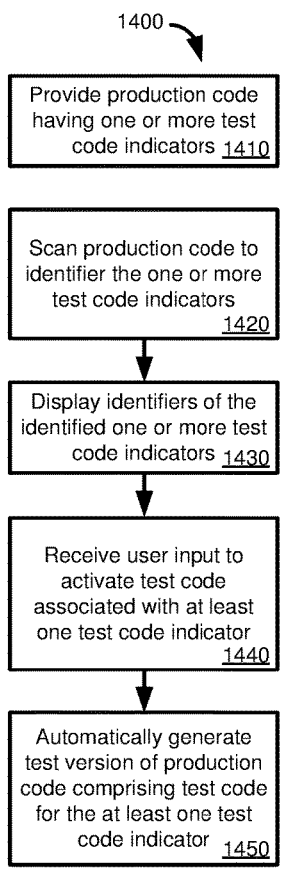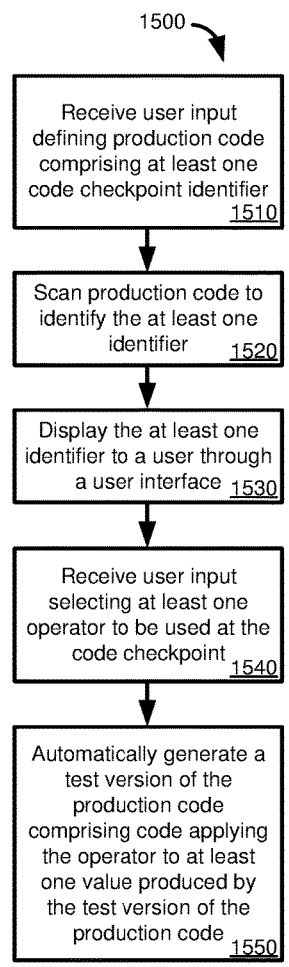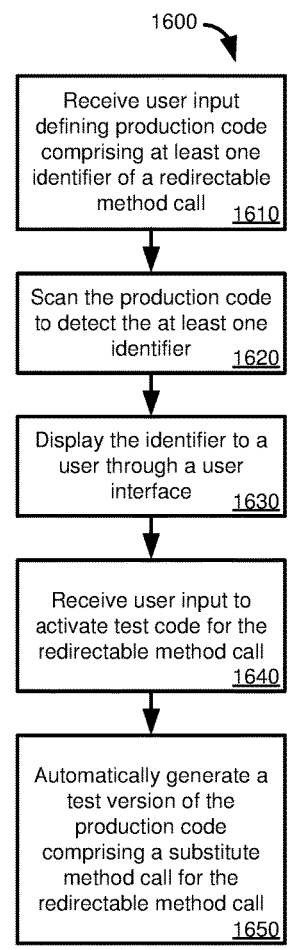
FIG. 14
FIG. 15
FIG. 16

FACILITATED PRODUCTION OF CODE FOR SOFTWARE TESTING

FIELD

The present disclosure generally relates to facilitating the testing of computer program code. Particular implementations provide automated or semi-automated generation of code to facilitate software testing. Particular implementations can be used standalone or can be integrated with existing testing frameworks of various programming languages.

BACKGROUND

Determining and correcting the source of software errors or performance issues, commonly referred to as debugging, remains a major problem in software development. Several studies have estimated that debugging consumes over fifty percent of software development time and costs. Although software configuration management systems and formalized debugging approaches can assist in debugging efforts, debugging can remain a tedious, time consuming task.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for automatically creating test code from production code. The production code can include one or more test code identifiers, such as of code checkpoints or modifiable code segments, for example, replaceable code segments or redirectable method calls. Using a user interface, such as a wizard, a user can view test code identifiers, select test code identifiers to activate, and optionally supply values, operators, or code to be used in the test code. The generated test code can include a test version of the production code that is separate from the production code. The generated test code can include test methods that include import parameters, export parameters and operators therefor, and other code to be used in tests to be performed using the test version of the production code.

A method is provided for generating test code from production code having one or more test code identifiers. Production code is provided having one or more test code indicators, or identifiers. A test code indicator can designate, for example, a code checkpoint, a redirectable method call, or replaceable code segment. The production code is scanned to identify the one or more test code indicators. Identifiers of the identified one or more test code indicators are displayed to a user, such as through a user interface, which can be part of a wizard. User input is received to activate test code associated with at least one test code indicator. The user input can also include values, operators, or code to be used in test code. A test version of the production code is automatically generated. The test version of the test code comprises test code for the at least one test code indicator.

According to another embodiment, a method is provided for producing a test version of production code, having checkpoint code. User input is received defining production code. The production code includes at least one checkpoint identifier. The production code is scanned to identify the at least one identifier. The at least one identifier is displayed to a user through a user interface. User input is received selecting at least one operator to be used at the code checkpoint associated with the at least one identifier. A test version of the production code is automatically generated. The test version of the production code includes code applying the at least one operator to at least one value produced by the test version of the production code.

In a further embodiment, a method is provided for producing a test version of production code, having a substitute method call for a redirectable method call in the production code. User input is received defining production code. The production code includes at least one identifier of a substitutable method call. The production code is scanned to detect the at least one identifier. The at least one identifier is displayed to a user through a user interface. User input is received to activate test code for the redirectable method call associated with the at least one identifier. A test version of the production code is automatically generated. The test version of the production code includes a substitute method call for the redirectable method call.

According to another aspect, a method is provided for generating a test version of production code. The method includes receiving user input defining production code. The production code includes at least one identifier of a modifiable code segment, such as a replaceable code segment or a redirectable method call. The production code is scanned to detect the at least one identifier. The identifier is displayed to a user through a user interface. User input is received to activate the test code for the modifiable code segment. A test version of the production code is automatically generated, which includes a modified code segment, such as a replacement code segment or a redirected method call.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 1 presents example original software code containing indicators for test code and a test version of the original software code with automatically inserted test code at activated indicators.

FIG. 14 is a flowchart illustrating processing in a method of generating a test version of production code.

FIG. 15 is a flowchart illustrating operations in a method of generating a test version of production code that contains one or more code checkpoint identifiers.

FIG. 16 is a flowchart illustrating operations in a method of generating a test version of production code that contains one or more redirectable method calls.

DETAILED DESCRIPTION

EXAMPLE 1

Overview

Figure 2:
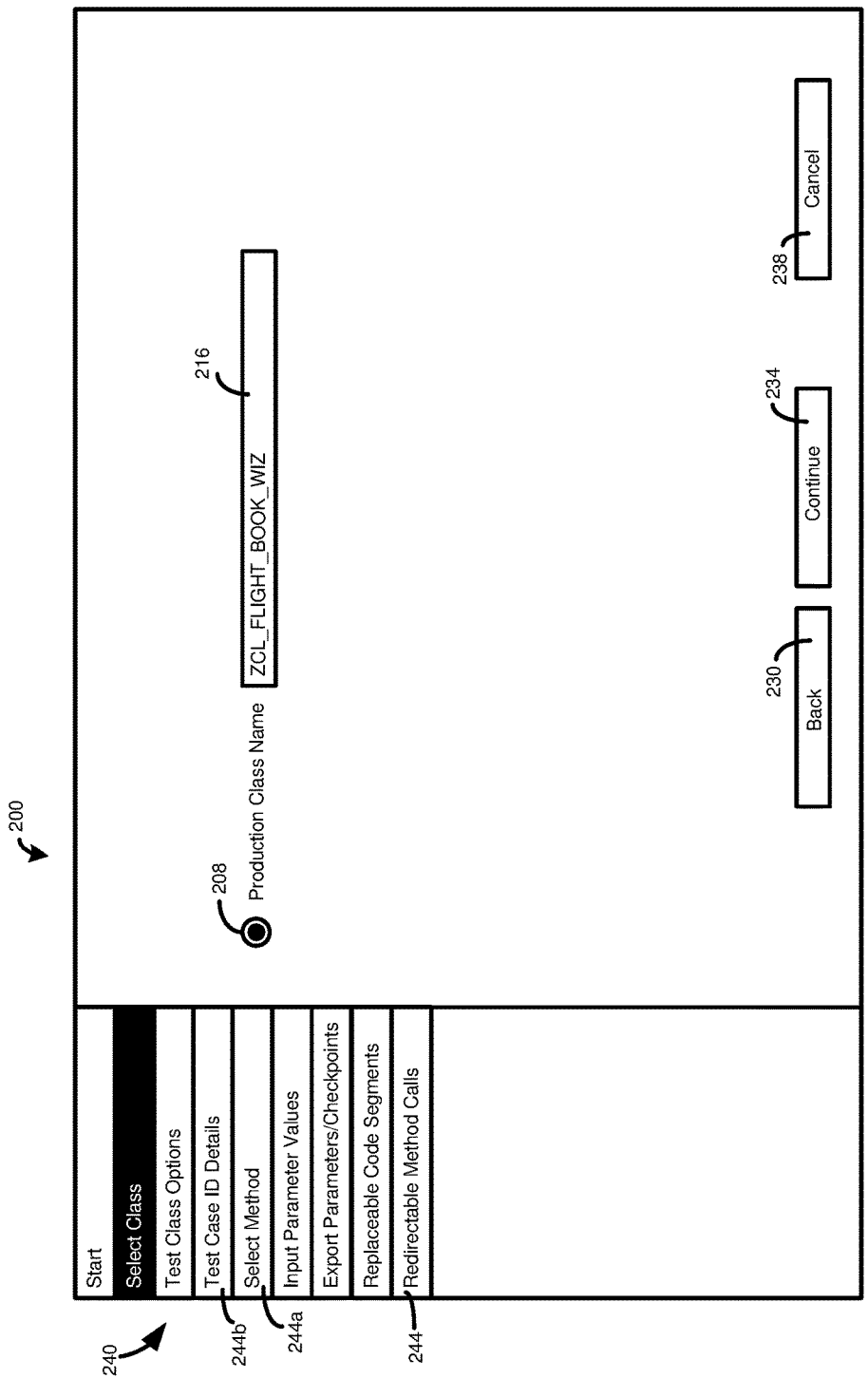
FIG. 2 is an example user interface screen for selecting a class for which test code will be generated.

Software is ubiquitous in today's society. Software is being incorporated into an increasing number of devices, developed and improved for an ever increasing number of applications, and is growing ever more complex. Determining and correcting the source of software errors or performance issues, commonly referred to as debugging, remains a major problem in software development. Several studies have estimated that debugging consumes over fifty percent of software development time and costs.

As used herein, a bug, also referred to as a coding error or software defect or fault, refers to code behavior that produces unintended or undesirable behavior. Bugs can result from failure to follow the correct syntax of a programming language. Bugs can also result from improper code semantics or code design, such as mathematical operator errors (e.g., division by zero), variables that may go out of bounds (e.g., a variable that causes an array to go out of bounds), memory leaks, security flaws, or bugs that result from improper interaction of software modules or components. Categories of bugs can include arithmetic errors, logic errors, syntax errors, resource errors, threading errors, interface errors, or errors resulting from the interaction of different programmers. Bugs can be associated with these and other types. In some cases error messages or codes, including error messages from exception handling routines, can provide an indication of a bug, including its type and possible information as to its cause.

Typically, software developers test code at various stages of development. Testing code can involve more than simply executing code and looking for errors. For example, in many cases, software development occurs in a componentized or modular fashion. Different developers, or development teams may be working on different parts of a larger program, or various components may be in different stages of development. If the components interact, it can be difficult to test a component whose operation depends on one or more other components that are not available, not fully developed, or are not suitably tested and debugged (which may, for example, make it more difficult to determine which component contains a bug).

One way to deal with the issue of incomplete or unavailable components is to hard code values that may be externally supplied (e.g., input values, which can be actual parameters or arguments), such as values provided by user input, values from another data source (e.g., a database system that may not be available during testing), or values that may be returned by other component (e.g., return values from calling a function or method, or provided in response to an API call or similar mechanism). However, hard coding these values can be time consuming, particularly when the needed values may change at different points during software development, or when some values that were originally hard coded are later to be removed. Or, in the case of a call to a method, the developer may have to create an empty method that can be called, or create a method that contains sufficient functionality to allow testing (e.g., providing return values).

In some cases, rather than hard coding values, a developer may wish to replace or disable certain code sections that might be desired in the final version of the code, but which should not be run during testing. Although a developer can disable the code manually (e.g., by commenting it out or using a similar mechanism), and optionally insert different code instead, this process can be cumbersome, time consuming, and prone to errors. For example, when the developer continues to work on the code, it will be more cluttered and complex, and the temporary code may need to be removed or commented out.

When debugging, it can sometimes be difficult to determine if code is functioning properly. Even if an error is detected, it can be difficult to determine the source of an error. In some cases, it can be useful to output information, such as variable values, during program execution that is different than (or in addition to) any output that might be provided during normal program execution. A developer can manually cause such values to be checked or displayed (e.g., using cout statements in C++). Again, however, this process can be time consuming and can result in code that is more cluttered, complex, and difficult to read. When checks are performed, such as on variables, the nature of the check can vary over time, which may cause the check to be rewritten or edited, further increasing development time and costs.

In some cases, code associated with debugging efforts and testing is left in production code. Among other things, it may be cost prohibitive to have a developer manually remove code used for testing and debugging. Including such code in production code can increase the size of a software installation and potentially cause other issues, such as security flaws.

The present disclosure provides technical innovations that can facilitate the creation and execution of software debugging and testing. In one aspect, the present disclosure provides for code checkpoints, or SPOTs, where values can be tested, output, or a combination thereof during program execution. In at least some cases, prior to execution, particular checkpoints can be enabled or disabled, and particular types of assertion (e.g., tests) are performed. The checkpoints can be indicated in code to be tested, where code implementing the testing can be inserted prior to test execution.

In this way, the code being developed can be kept more concise, and can be more easily changed. That is, if the nature of the assertion changes, the code can automatically be updated to reflect the change when the next test is to be performed. Similarly, if only certain checkpoints are desired to be used, only those checkpoints can be expanded prior to testing. Thus, the development effort of viewing and testing values is reduced, and the development or production code is less cluttered. The checkpoint indications can be left in the production code, as they typically do not require a large amount of code, and the code is typically not associated with other functionality. Or, the checkpoint indications can be easily located and removed by searching for a particular keyword used to declare a checkpoint.

In another aspect, the present disclosure provides for automating a process for identifying redirectable method calls, replacing the redirectable method call with a substitute method call, and creating, and optionally populating, a substitute method to be called by the substitute method call. When a method call indicated as a redirectable method call is selected (or in cases where all redirectable method calls are automatically to be processed) a blank substitute method can be created for the substitute method call. An option can be provided to supply code to be inserted into the blank method. In this manner, the developer is saved from having to create the blank method. Also, the developer can choose to use the blank method or to insert different code to be executed when the test is performed and the test method called. That is, first code might be selected or inserted the first time the test is executed and different second code might be selected or inserted the second time the test is executed. In some implementations, if a redirectable method call is selected, the blank/user inserted code is executed, while a production version of the code is executed if the redirectable method call is not selected.

In a further aspect, the present disclosure provides for automating a process for executing replacement or substitute code for a section of program code. Indicators can be placed at the beginning and end of a code block that may (or may not) be substituted during test execution. In some implementations, a user may choose whether or not original code is to be executed during testing, or whether substitute code should be executed. Along with providing greater flexibility in determining whether original or substitute code is to be executed during testing, the user may change the substitute code as desired for different test runs. This can greatly improve testing, as the user need not edit the production code prior to running a test, if the user desires to change the substitute code, or choose whether or not the substitute code is to be executed.

In many cases, even if some limited support is provided for testing and debugging, changes are made to a production version of the code. As discussed above, this can be problematic for various reasons. According to an aspect of the present disclosure, when a test is to be performed, a separate set of the relevant code components is created that incorporates any test-specific code, such as the checkpoint code, methods for substituted method calls (for redirectable method calls), substitute method calls, or substitute code for replaceable code segments. Thus, the production code can be tested, but without affecting the content of the production code. If desired, test code can be persisted, and, for example, shipped with production code. Or, both test and production code versions can be provided.

The present disclosure also provides an interface that can assist a user in testing code, including using one or more of the above features. For example, the interface can be in the form of a wizard that guides a user through various test options, including selecting code components (e.g., methods/classes) to be tested, and, for a particular code component, activating and setting values for particular checkpoints, activating, creating and, optionally, populating substitute methods (and replacing a corresponding redirectable method call with a substitute method call), and activating code replacement sections and providing substitute code to be executed in its place.

In the examples that follow, aspects of the present disclosure are described with respect to the ABAP programming language, and frameworks and programming environments useable with ABAP. However, the disclosed technologies may be used with any computing languages, and functionality added, removed, or altered as needed depending on the computing language. In addition, at least certain aspects are described using existing frameworks or programming environments. However, disclosed technologies can be adapted to work with such environments and frameworks, or can include independent functionality for performing functions provided by the environments and frameworks.

EXAMPLE 2

Example Features to Facilitate Code Testing

FIG. 1 provides an example original code segment 100, representing production code, such as production code being developed, and an example test code segment 102, such as test code that is at least partially automatically generated from the original code segment 100. The test code segment 102 can be generated from the original code segment 100 using one or more of the innovations disclosed herein.

The original source code segment 100 represents a portion of code for a method 110, such as a method to search for available economy class seats on a particular flight itinerary. The code for the method 110 includes a modifiable code segment in the form of a replaceable or substitutable code segment 112, which can be indicated in various ways, such as by including a statement 114 indicating a starting position for the replaceable code segment, and a statement 116 indicating an end position for the replaceable code segment. As described in Example 1, the replaceable code segment 112 can be selectively executed, replaced with other code, or simply not executed (which can be equivalent to replacing the replaceable code segment with "empty" code, or commenting out or otherwise rendering unexecutable the replaceable code segment).

The test code segment 102 includes the statements 114 and 116 indicating the replaceable code segment 112, but the code of the replaceable code segment has been replaced by substitute code 120. Substitute code 120 can be, for example, code provided by a developer in order to generate the test code segment 102. As will be further described, a user interface, such as in the form of a wizard, can be provided to allow a user to select which replaceable code segments to replace, and to specify replacement code. The test code 102 can be automatically generated by replacing the replaceable code segment 112 with the substitute code 120.

Original code segment 100 includes code checkpoints 124, 126, 128. The code checkpoints 124, 126, 128 can be indicated by a particular keyword (e.g., "TEST-SPOT") and can include one or more identifiers, such as a name of the checkpoint (e.g., "check_currency) and a variable (e.g., "ls_flight-CURRENCY"). Note that code is not otherwise associated with the checkpoints 124, 126, 128 in the original source code segment 100.

The test code segment 102 illustrates how disclosed technologies can add code for checkpoints, such as checkpoints 124, 126, 128. As will be further described, a user interface, such as in the form of a wizard, can be provided to allow a user to select which checkpoints to use or activate, and to specify how values should be checked, such determining the status of a variable, including whether the variable has been assigned and its value relative to another value (e.g., a value supplied by the developer via the user interface). The test code 102 can be generated by automatically adding appropriate code proximate the checkpoint 124, 126, 128. For example, test code 102 shows checkpoint code 130 added after checkpoint 124, while checkpoints 126 and 128 have not been activated. Checkpoint code 130 indicates that a variable is to be checked as equal to a certain value, and an error message displayed if the variable is not equal to the value.

Both the original code segment 100 and the test code segment 102 include a modifiable code segment in the form of a redirectable method call 140. The redirectable method call 140 can be a method for which a substitute implementation can be created during testing, and the replaceable call can be substituted with a call to the substitute implementation. When the original code segment is deployed in a production environment, the redirectable method call 140 can be left unchanged and can call a production method.

The redirectable method call 140 can be indicated as such using a starting statement 142 and an ending statement 144. In at least some cases, the starting and ending statements 142, 144 are used to designate a redirectable method call 140. In some cases, having a commented redirectable method call in the original code segment would typically require the original code segment 100 to be changed prior to being executed in a production environment (e.g., the commenting would have to be removed to make the removable method call active). Thus, the use of the starting and ending segments 142, 144 can facilitate code testing by allowing redirectable method calls 140 to be located and handled without requiring the original code segment 100 to be modified prior to deployment.

The redirectable method call 140 can include an identifier 148, such as a name. The identifier 148 can be used to provide an option to a user to active the redirectable method call 140 during testing, which can then be directed to call a non-production method, or not to activate the test method call, which can then be directed to call the production method during testing. As will be further described, providing a user an option to activate the redirectable method call 140 can include an option for a user to supply code for the non-production method. In the test code 102, the redirectable method call 140 has been changed to substitute method call 150.

In at least some aspects, the original code segment 100 and the test code segment 102 are separately maintained. That is, when testing is to be performed, the original code segment 100 is analyzed, such as to determine the presence, and, typically, identifiers, for the replaceable code segment 112, the code checkpoints 124, 126, 128, and the redirectable method call 140. For the replaceable code segment 112 and code checkpoints 124, 126, 128, if they are activated for testing, the replaceable code segment is replaced with substitute code 120, and suitable code, such as checkpoint code 130, is added for activated code checkpoints.

Thus, testing can produce the test code segment 102 such that the original code segment 100 need not be modified. Maintaining the test code segment 102 separately from the original code segment 100 can result in the original code segment being easier to read and maintain, as it does not include much of the test-specific code of the test code segment. Similarly, particularly when source code, or other human-readable code is shipped, the code can omit much of the test-specific code (or, in further cases, all test-specific code can be removed, such as by removing lines having starting and ending segments 142, 144). As the original code segment 100 typically has fewer lines that the test code segment 102, it can also be smaller (whether compiled or not) that the test code segment. In addition, having fewer lines of code, the production code can be more secure.

EXAMPLE 3

Example User Interface for Producing Test Code

FIGS. 2-9 illustrate example screens that can be provided by a user interface, such as in the form of a wizard, to allow a user to test code. The wizard takes user input and makes appropriate modification to original code to produce test code.

FIG. 2 illustrates an example screen 200 that allows a user to select a class to be tested. However, the disclosed technologies, including a user interface or wizard, can be implemented in other manners. For example, a user may be provided an option to select a particular file containing the original code.

FIG. 2 illustrates a radio button 208 that allows a user to select a class. The class can be a global class or a local class. In some cases, such as in the ABAP programming language, a global class can be a class that is available to multiple programs, while a local class is a class that is available to a specific program.

The screen 200 can provide options to navigate through the wizard, such as an element 230 to return to a previous screen, an element 234 to move to a next screen, and an element 238 to cancel or close the wizard. In at least some cases, the wizard can be associated with logic that checks user input elements of the screen 200, such that it is determined whether the user has entered suitable information in the screen 200 to move to the next screen using element 234. If suitable information has not been provided, an error message can be provided to a user, including an indication of which information is missing or incorrect.

The navigational options can also include a list 240 of screens or steps associated with the wizard. In particular implementations, list elements 244 can be selected to load a corresponding screen of the wizard. The wizard can include logic such the list elements 244 are not available for selection until a user has completed any earlier screens that provide input used in a later screen. For example, the input parameter list element 244*a* may not be active for selection until the user has completed the test case ID details screen associated with list element 244*b*.

Figure 3:
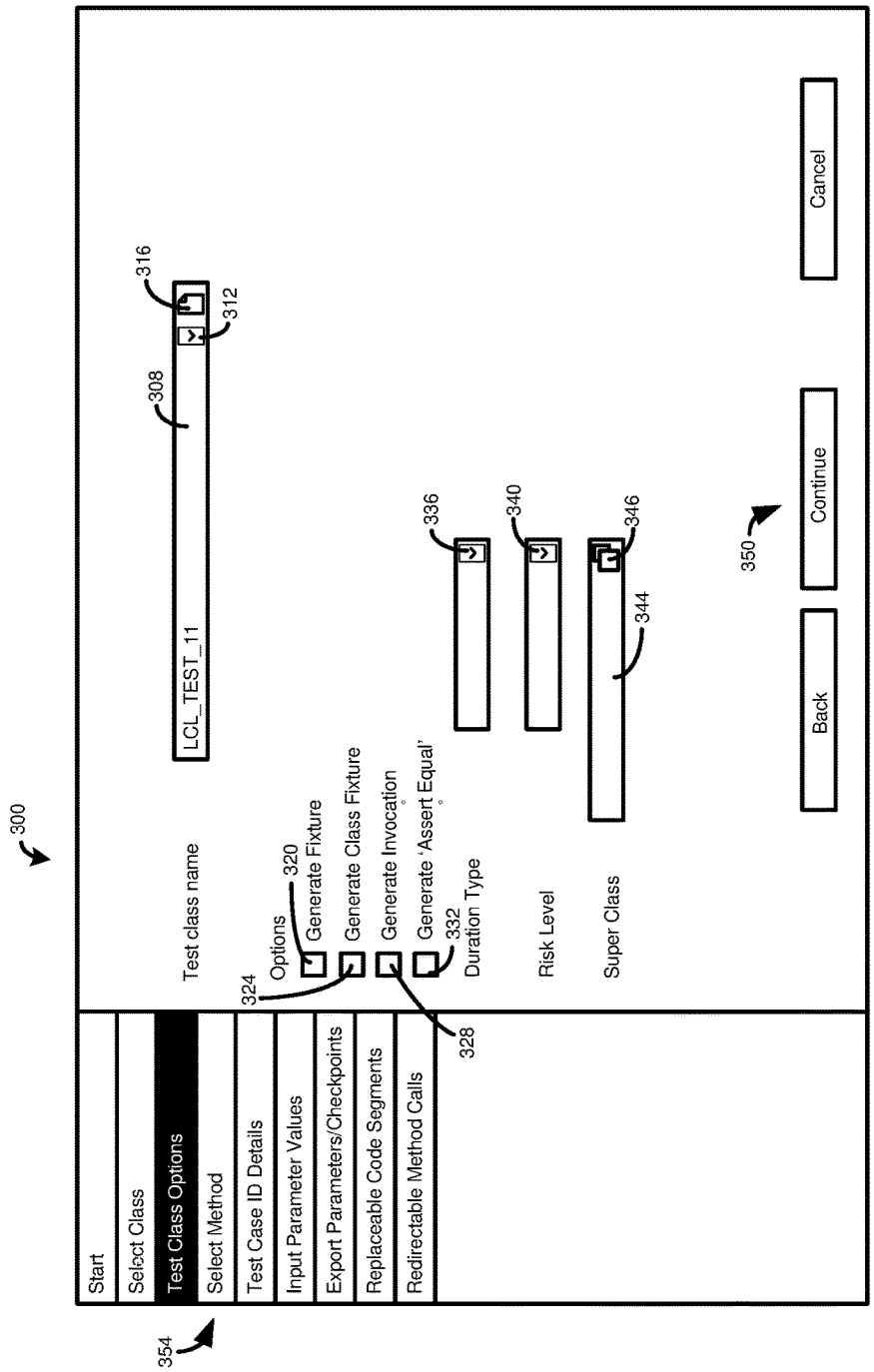
FIG. 3 is an example user interface screen for selecting options for test class generation.

FIG. 3 illustrates a screen 300 where a user can select or create a test class that will be associated with at least certain test code generated using the wizard, as well as configuring certain testing parameters. The test class can include code such as import parameters, export parameter checks, and replaceable code segments to be activated, as well as substitute code to be used therewith.

The screen 300 provides an entry field 308 for a name of the test class. The entry field 308 can include a dropdown menu icon 312, which can allow a user to select a previously created test class. Or, the user may choose to enter a name for a new test class by selecting a "create new" icon 316. The user can be allowed to designate a test class in other manners, such as by browsing for a test class, or can include an entry field in which a user can directly enter a name for a test class.

The screen 300 can provide a selectable option 320 for generating a fixture, which can be a test configuration that produces particular behavior for a test. For example, a fixture can include data, objects, resources, and connections used for the test. In a specific implementation, a fixture can be a fixture as used in the ABAP programming language. A fixture associated with the selectable option 320 can include setup and teardown methods that are called at the beginning and end of each test method.

The screen 300 can provide a selectable option 324 for generating a class fixture. A class fixture can generate setup and teardown methods that are respectively called once— when the class is called and when test execution ends. Thus, while the fixture of the selectable option 320 is executed for every test method, the class fixture of the selectable option 324 is called for a particular test.

A selectable option 328 can be provided to generate an invocation for the test. The invocation can generate a call to each method to be tested in the test class, and can include providing default parameter values for the method.

The screen 300 can provide a selectable option 332 to generate tests for return or exported values. In particular cases, the return or exported values can be tested for whether they are equal (or have another relationship with respect) to a default value or a user-supplied value.

Dropdown selector 336 can provide an option for how long test code should be allowed to run, such as for a short period of time, a long period of time, or an intermediate period of time. The period of time selected for running the test can be used to terminate the test and/or generate an error message if the test runs longer than a threshold time for the selected period. For example, a "short" period of time may be five minutes, with the test being terminated, and an error message generated, if the test code does not naturally terminate before five minutes have elapsed.

A risk level can be specified using dropdown selector 340. The dropdown selector can be used to select categories such as high, medium, and low (or harmless). The risk designation may be used, for example, to determine what privileges the test is allowed (e.g., an amount of CPU time, an amount of memory, access to network resources, whether configuration settings may be changed, etc.), and whether any changes made by the test are persisted, including being persisted if the test aborts (either by its own accord or being terminated as exceeding a specified run time using the dropdown selector 336).

An entry field 344 can allow a user to select a superclass for the test class. The entry field can allow a user to enter a name of the superclass, select the superclass from a dropdown menu, or browse for the superclass, such as using user interface element 346. In the event a superclass is provided, the test class can inherit data members and methods from the superclass. Inheriting from the superclass can be useful when a class (the superclass) contains test logic that may be useful for other classes. In at least some cases, a class that inherits from a superclass need not otherwise be a derived or child class of the superclass.

The screen can provide navigation options 350, which can be analogous to the options 230, 234, 238 of FIG. 2, and a navigation list 354, which can be analogous to the list 240 of FIG. 2.

In some cases, all or a portion of the screen 300 can be omitted. All or a portion of the options provided in the screen 300 can be automatically enabled, or set, without user input, in some aspects. For example, local test classes can be automatically created with fixtures, class fixtures, invocations, assert equals, or combinations thereof.

Figure 4:
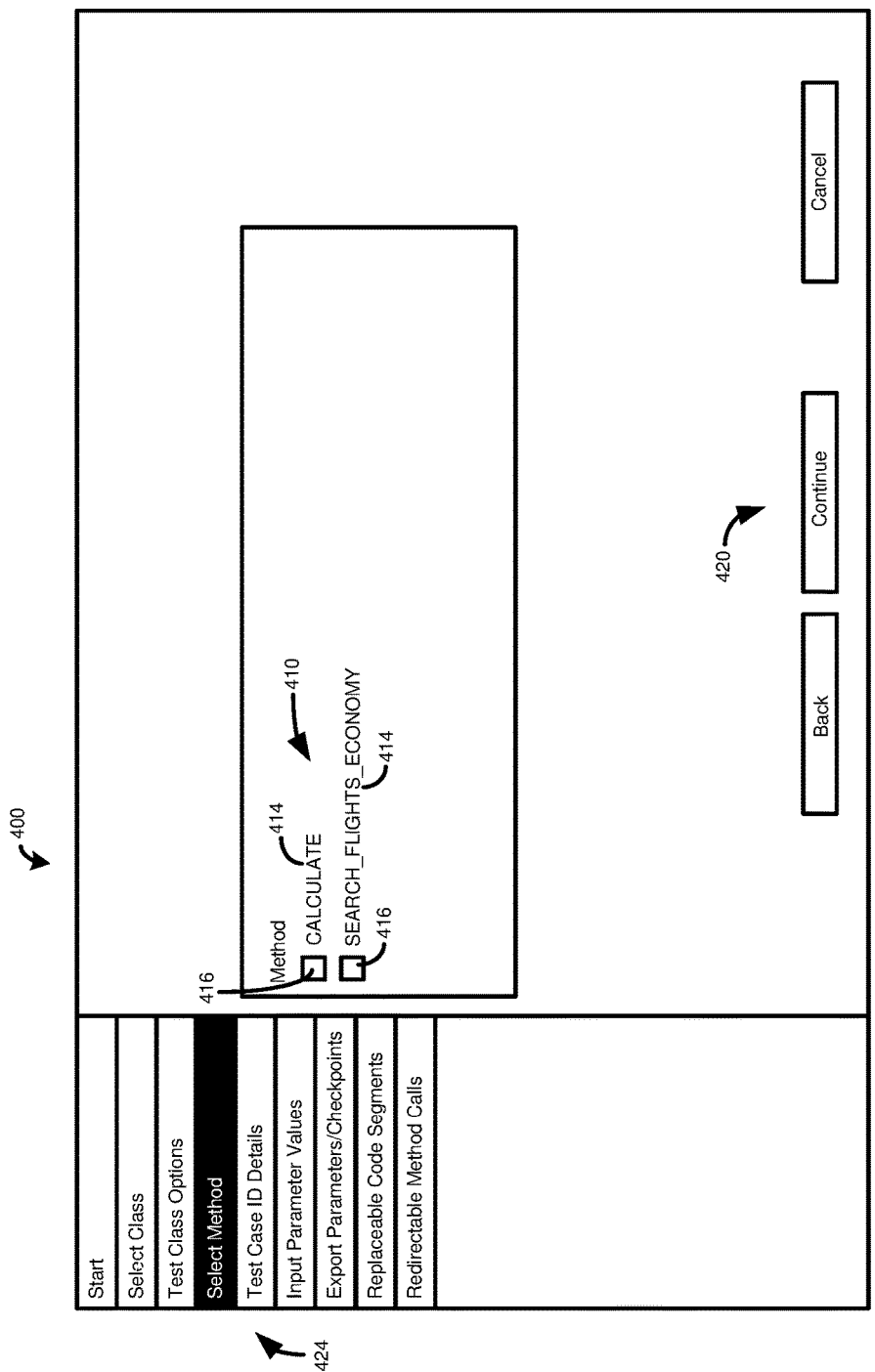
FIG. 4 is an example user interface screen for selecting class methods to be tested.

FIG. 4 illustrates an example screen 400 that can allow a user to select particular methods for which test methods will be generated. For example, rather than generating test methods for all methods of a selected class (e.g., a class selected through screen 200 of FIG. 2), a user may choose to test, or generate test code, only for a subset of available methods. In some cases, unselected methods are not tested. In other cases, unselected methods are tested, such as along with selected methods, but the original code is used, rather than generating test code that differs from the original code or generating tests that specifically test the unselected methods.

FIG. 4 illustrates a plurality of available methods 410, each of which includes a name 414 of the respective method, and a selection box 416 where a user can choose whether or not to include the respective method in testing. FIG. 4 can include navigation options 420, which can be analogous to the options 230, 234, 238 of FIG. 2, and a navigation list 424, which can be analogous to the list 240 of FIG. 2.

Figure 5:
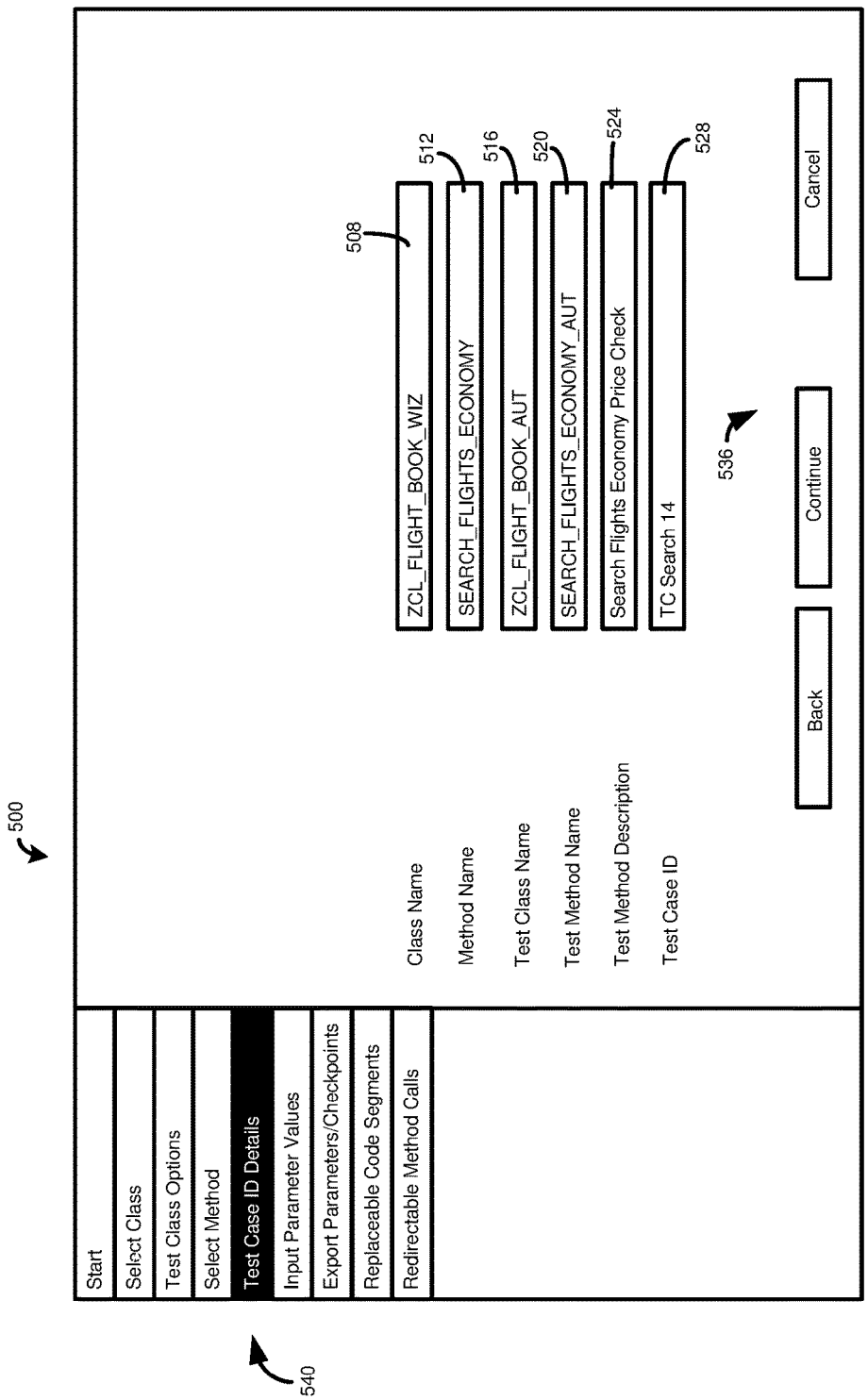
FIG. 5 is an example user interface screen for editing test class and test method metadata.

FIG. 5 illustrates an example screen 500 where a user can enter or edit identifying information or other types of metadata for a test class or a test method. The screen 500 includes entry boxes for a class name 508, a method name 512, a test class name 516, a test method name 520, a test method description 524, and a test case ID 528. In some cases, at least certain entry boxes of the entry boxes 508, 512, 516, 520, 524, 528 can include default values, or can be auto populated based on information previously entered by the user, such as in screen 200, screen 300, or screen 400. At least some of the default or auto populated values can be edited by a user. For example, the user may be allowed to change the text in the test method description 524 and the test case ID 528.

At least some of the default or auto populated values may be formed based on other information associated with the test scenario. For example, in some cases, the test class name 516 may be derived from the class name 508, such as having a different extension than class name. Similarly, the test method name 520 may be derived from the method name 512, such as having a different extension than the method name.

FIG. 5 can include navigation options 536, which can be analogous to the options 230, 234, 238 of FIG. 2, and a navigation list 540, which can be analogous to the list 240 of FIG. 2.

Figure 6:
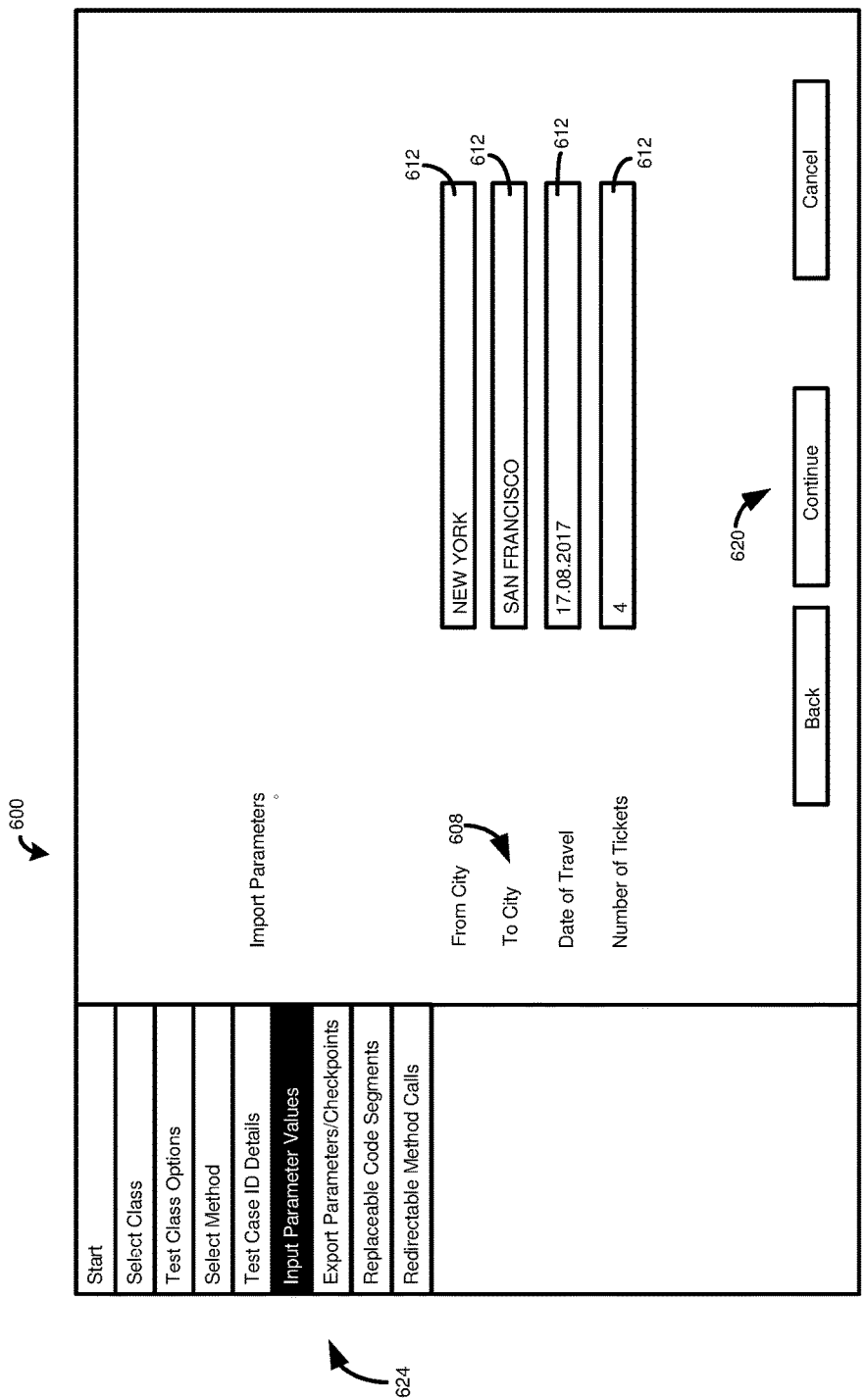
FIG. 6 is an example user interface screen for defining input values to be used in a test scenario.

FIG. 6 provides an example screen 600 that can allow a user to supply values (e.g., actual or import parameters, or arguments) that may be used in executing test methods and/or testing production code. The import parameters, in at least some cases, can be automatically determined from the original code (e.g., by evaluating method declarations, or by analyzing methods for particular keywords, such as "IMPORTING"). The screen 600 illustrates identifiers 608, such as a parameter name, being presented for each import parameter. Entry boxes 612 are provided for each identifier. A user can enter a desired value for each identifier 608 in the respective entry box 612. In some cases, rather than an entry box 612, a user can select a value in another manner, such as a dropdown menu or a value picker. In further cases, default or suggested import parameter values can be provided.

The screen 600 can provide navigation options 620, which can be analogous to the options 230, 234, 238 of FIG. 2, and a navigation list 624, which can be analogous to the list 240 of FIG. 2.

Figure 7:
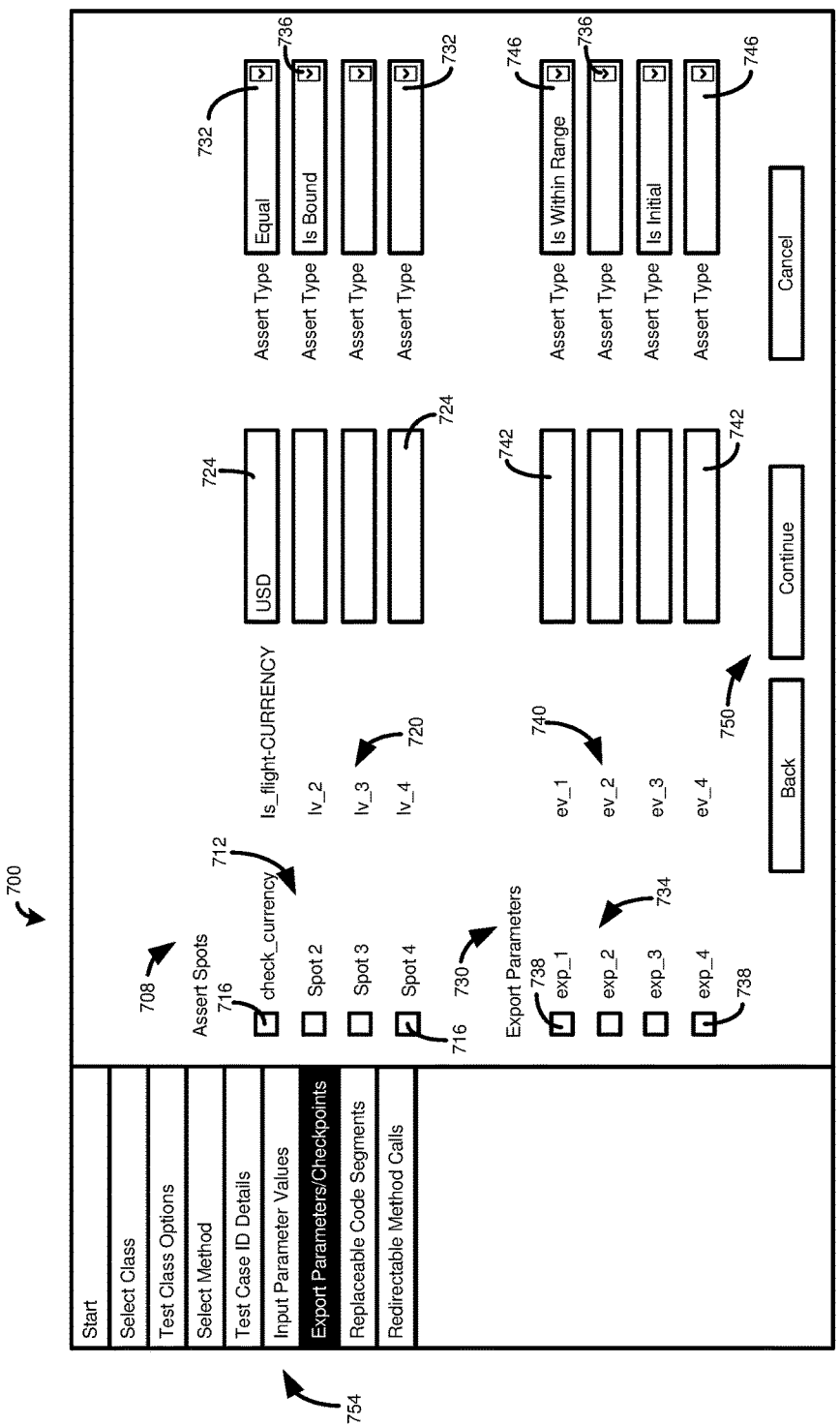
FIG. 7 is an example user interface screen for selectively activating and configuring code checkpoints and export parameter checks.

FIG. 7 provides an example screen 700 that can allow a user to specify values and operators for code checkpoints and export parameters (e.g., return values or values that are otherwise produced and made available by a test method and/or tested production code). A first screen portion 708 can provide a list of code checkpoints, such as a listing of identifiers 712, for example names, of the code checkpoints. Each code checkpoint identifier 712 can be associated with a selection box 716. A user can select or deselect the selection box 716, where selection indicates that the code checkpoint will be activated, and unselected boxes will not be activated.

Each code checkpoint identifier 712 can be associated with one or more variables 720, which can be indicated by a name of the variable. Each variable 720 can be associated with an entry box 724, where a user can enter a value which will be used for evaluation by an operator. In other cases, variable values can be assigned or selected in another manner, such as by providing default or suggested values, by providing a dropdown list of values, or providing a value picker user interface element.

In some cases, a variable 720 need not be assigned a value. That is, for example, some operators may not evaluate a variable value, but can evaluate other characteristics of the variable, such as whether the variable still has an initially assigned value or whether the variable is bound to a value.

Each code checkpoint identifier 712 can be associated with a particular type of operator 732, or assertion. The operators can be selected, in some cases, using a dropdown menu user interface element 736. In other cases, the operators can be selected in another manner. For instance, a user may manually enter a particular operator. Typically the operators are applied to variables at particular code execution points and, optionally, any value provided in an entry box 724.

Operators can include operators that determine whether a value in an entry box 724 and a value of a variable during code execution are equal, are not equal, or whether one value is greater than, greater than or equal to, less than, or less than or equal to the other value. Operators can determine whether a variable is bound or not bound, or whether the variable has its initial value or no longer has its initial value.

A second screen portion 730 can provide a list of export parameters, such as a listing of identifiers 734 of export parameters. Each export parameter identifier 734 can be associated with a selection box 738, a variable or parameter identifier 740, an entry box 742, and an operator 746, which can be analogous to the selection box 716, entry box 724, and operator 732 of the first screen portion 708.

The screen 700 can provide navigation options 750, which can be analogous to the options 230, 234, 238 of FIG. 2, and a navigation list 754, which can be analogous to the list 240 of FIG. 2.

Figure 8:
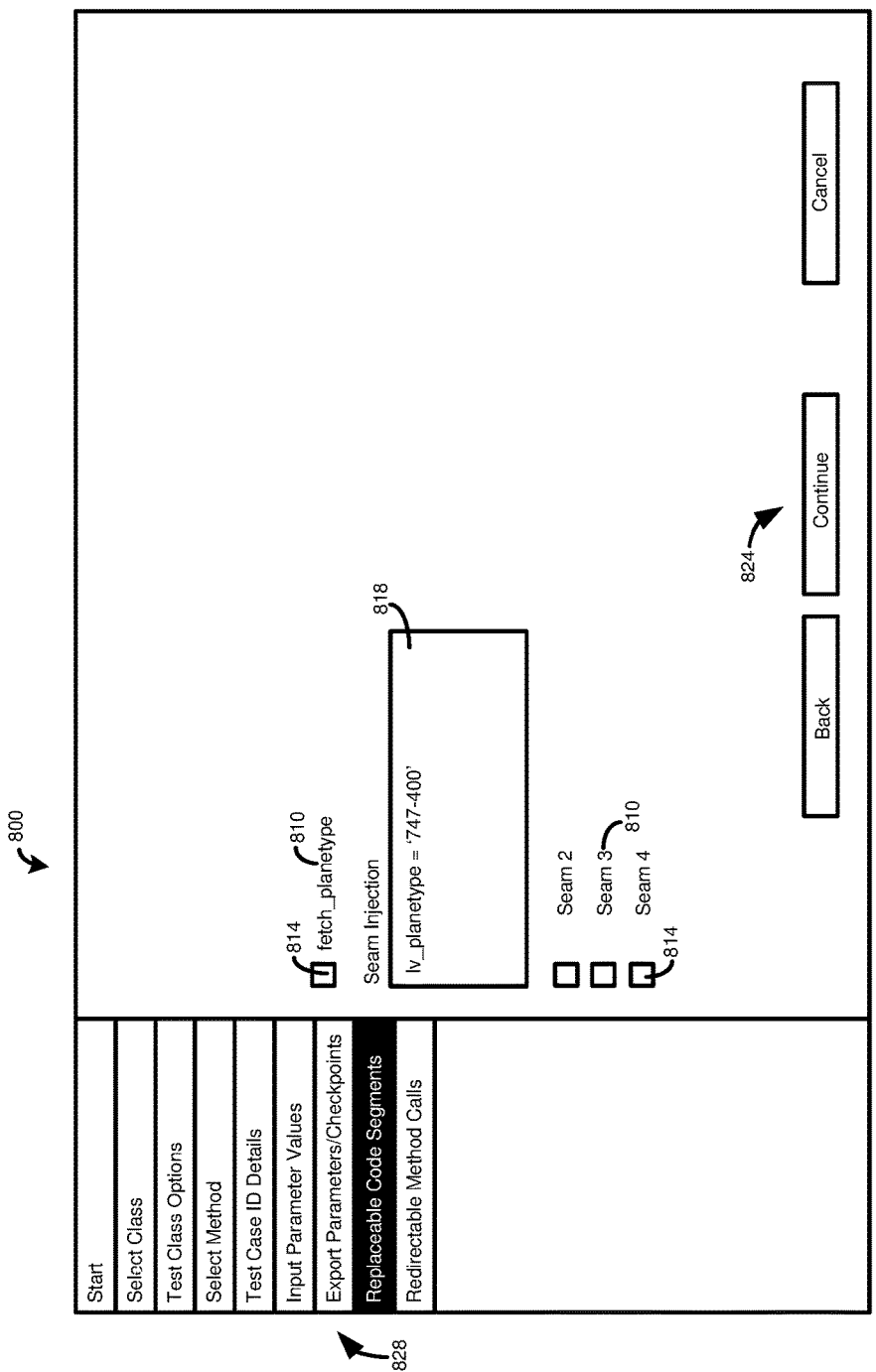
FIG. 8 is an example user interface screen for selectively activating and configuring replaceable code segments.

FIG. 8 provides an example screen 800 that can allow a user to select replaceable code segments to active, and optionally provide substitute code to be used instead. The screen 800 can provide identifiers 810, such as names, for each replaceable code segment. As described in Example 2, the identifiers 810 can be included in original code that declares or otherwise indicates a code segment as a replaceable code segment. Each identifier 810 can be associated with a selection box 814. A user can select or unselect selection boxes 814 to indicate whether a particular replaceable code segment should be executed in original code (i.e., not replaced) or whether substitute code should executed instead of the original code of the replaceable code segment.

If a user selects a selection box 814, an entry box 818 can be provided, in which the user can enter replacement code. In the illustrated example, the entry box 818 contains a simple variable assignment. However, other types of code, including longer and more complex code, and be included in an entry box 818. In some cases, the entry box 818 can be left empty. If a selection box 814 is selected, but no code is entered in the entry box 818, the original code of the replaceable code segment is not executed, but no substitute code is executed in its place.

The screen 800 can provide navigation options 824, which can be analogous to the options 230, 234, 238 of FIG. 2, and a navigation list 828, which can be analogous to the list 240 of FIG. 2.

Figure 9:
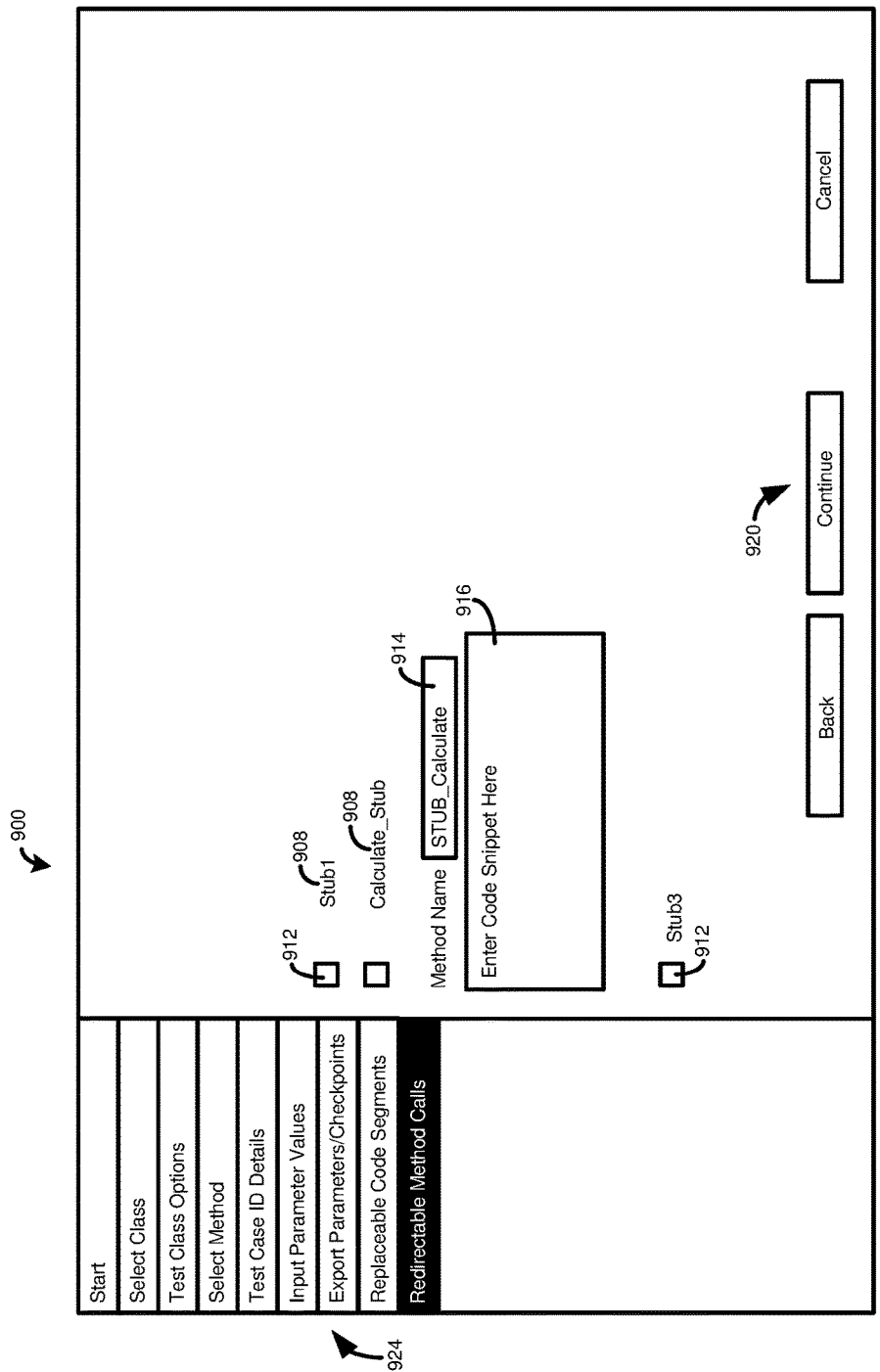
FIG. 9 is an example user interface screen for selectively activating and configuring redirectable method calls.

FIG. 9 provides an example screen 900 that can allow a user to select whether redirectable method calls should be redirected from a production method to a substitute method. The screen 900 can provide identifiers 908, such as names, for each redirectable method call. The identifiers 908 can be provided in original code indicating a method call as a redirectable method call, such as in a comment or declaration proceeding a method call.

Each identifier 908 can be associated with a selection box 912. A user may indicate whether a redirectable method call should be redirected from a production method to a substitute method by selecting or deselecting the corresponding selection box 912. If a selection box 912 is selected, an entry box 914 can be provided where a user can enter a name or identifier of the substitute method call (e.g., a name of the method, optionally including any arguments to be supplied). In addition, if a selection box 912 is selected, an entry box 916 can be provided where a user may enter code to be used in place of code of a production method. In some cases, a substitute method may provide values (e.g., return values) to be used by the original code.

In a particular aspect, if the called method does not yet exist, is not otherwise available, or may not supply correct values, a user can hardcode specific return values in the entry box 916. For example, if a test method call 908 queries a database that is not available or populated, the user can enter suitable values in the entry box 916, which can present valid return values that might be expected once the database is available. Or, a user may choose to deliberately enter incorrect values to determine whether the original code has sufficient error handling procedures. If a user does not enter text in the entry box 916, the disclosed technologies can produce an empty (e.g., unimplemented) version of the substitute method called by the substitute method call.

The screen 900 can provide navigation options 920, which can be analogous to the options 230, 234, 238 of FIG. 2, and a navigation list 924, which can be analogous to the list 240 of FIG. 2.

Figure 10:
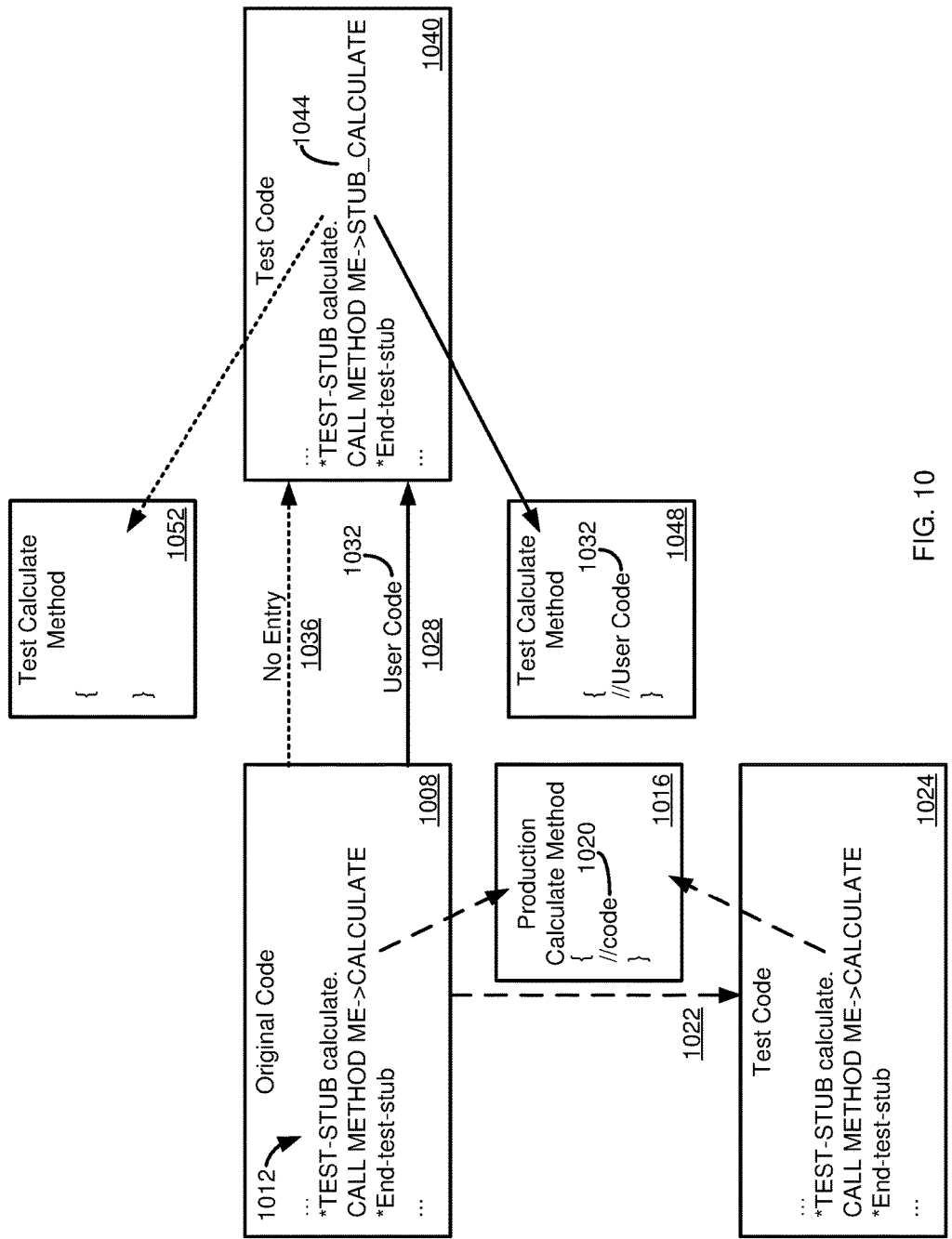
FIG. 10 schematically depicts the operation of a replicable method call when the redirectable method call is not activated, or is activated with and without user code.

The operation of the test method calls is further illustrated in FIG. 10. FIG. 10 illustrates original code 1008, having a redirectable method call 1012. The redirectable method call 1012 references a production method 1016 that contains code 1020. If test code 1024 is generated from pathway 1022 from the original code 1008, and the user does not activate the redirectable method call 1012, the test version of the production code will still call the production method 1016.

In pathway 1028, the user chooses to activate the redirectable method call 1012, and supplies user code 1032. In pathway 1036, the user chooses to activate redirectable method call 1012, and does not supply user code. Pathways 1028 and 1036 both result in test code 1040, which replaces the redirectable method call 1012 with a call 1044 to a substitute method. However, the test methods produced by pathways 1028 and 1036 differ. Pathway 1028 produces a substitute method 1048 that replaces the code 1020 with the user code 1032. Pathway 1036 produces a substitute method 1052 that replaces the code 1020 with nothing.

Although described as "replacing" code, it should be appreciated that substitute methods 1048, 1052 can be produced independently of production method 1016, so that the substitute methods do not contain the code 1020, but the code is not technically "replaced." For example, the substitute method can be included in new file or class definition that includes a blank substitute method or a substitute method that includes user code 1032.

EXAMPLE 4

Example Computing Environment

Figure 11:
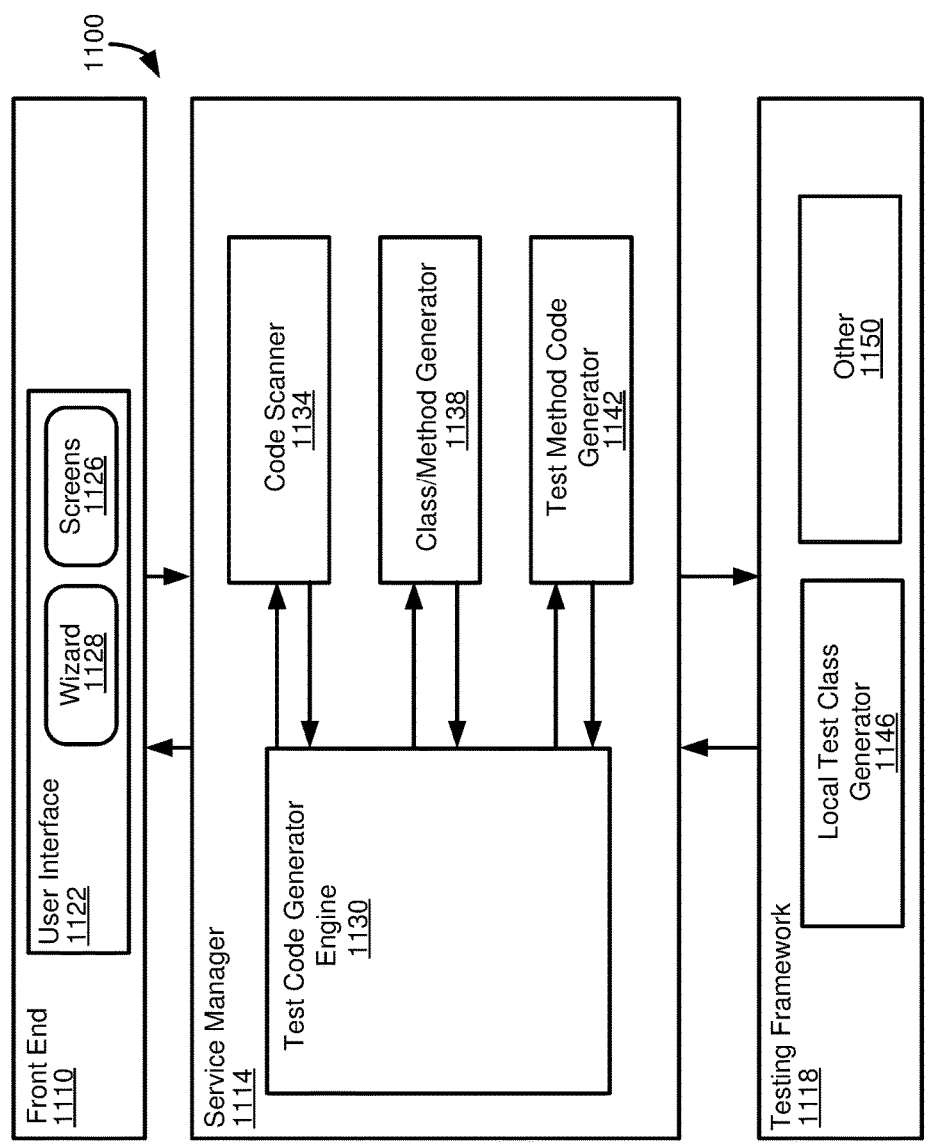
FIG. 11 is a block diagram of an example computing environment in which disclosed technologies can be implemented.

FIG. 11 illustrates an example computing environment 1100 in which the disclosed technologies can be implemented. The computing environment 1100 can include a front end component 1110, a service manager component 1114, and a testing framework 1118.

The front end 1110 can include a user interface 1122. The user interface 1122 can include functionality to provide information to, and receive input from, a user, For example, the user interface 1122 can include one or more user interface screens 1126 (e.g., the screens 200-900 of FIGS. 2-9) and can include logic to provide a wizard 1128 to guide a user through the screens.

The front end 1110 can communicate with the service manager 1114. For example, the front end 1110 can provide the service manager 1114 with user input for test code generation, and the service manager can provide the front end with data to be displayed in the user interface screens 1126.

The service manager 1114 can include a test code generator engine 1130. The test code generator engine 1130 can coordinate the process of generating test code, and can communicate with the front end 1110. In generating test code, the test code generator engine 1130 can call a code scanner 1134. The code scanner 1134 can scan original code to determine features such as import parameters, export parameters, replaceable code segments, redirectable method calls, and code checkpoints. The identified features can be provided by the test code generator engine 1130 to the user interface 1122.

The test code generator engine 1130 can call a class/method generator 1138. The class/method generator can generate a class that is used for code testing. The class generated for code testing can include original production code, some of which may be modified for testing. The generated class can also be used to contain test classes, which can be local classes, including local test classes generated by the testing framework 1118.

The test code generator engine 1130 can call a code generator 1142. The code/method generator 1142 can modify original code to provide test code. For example, the code/method generator 1142 can insert code for any activated code checkpoints and can update references to any redirectable method calls that have been activated (e.g., to refer to a test method rather than a production method). The code/method generator 1142 can also insert specified import parameter values, substitute code for replaceable code segments that have been activated, assertions for export parameters, and combinations thereof.

In some cases, the code/method generator 1142 can insert different types of test code in different types of files or objects. For example, a particular test framework, such as for the ABAP programming language, can include an existing test class framework, where test classes have test methods that include specified import parameters, specified substitute code segments for replaceable code segments, assertions for export parameters, and combinations thereof. Thus, those features can be modified in test methods of test classes using the code/method generator 1142. Other types of test code, such as substitute method calls, substitute methods called by the substitute method calls, and code checkpoints, can be inserted into other methods, such as methods of a global class that includes the test classes.

The testing framework 1118 can be in communication with the service manager 1114, such as with one or more of the test code generator engine 1130, the class/method generator 1138, or the code/method generator 1142. The testing framework 1118 can include a test class generator 1146. The test method code generator 1146 can generate test classes and test methods. Typically the test classes and test methods are empty classes and methods. In the absence of the service manager 1114, a developer would typically need to manually complete the test classes and the test methods. As described herein, this process can be automated, at least in part, using the service manager 1114 and the front end 1110.

The testing framework 1118 can include other components 1150. The other components 1150 can include, for example, components to activate all or a portion of the test classes or test methods, or to visualize coverage between production code and test classes and methods. Or, in some cases, components of the testing framework 1118 can be included in another component. For instance, the local test class generator 1146 may be included in the service manager 1114.

EXAMPLE 5

Example Production of Global and Local Test Classes

Figure 12:
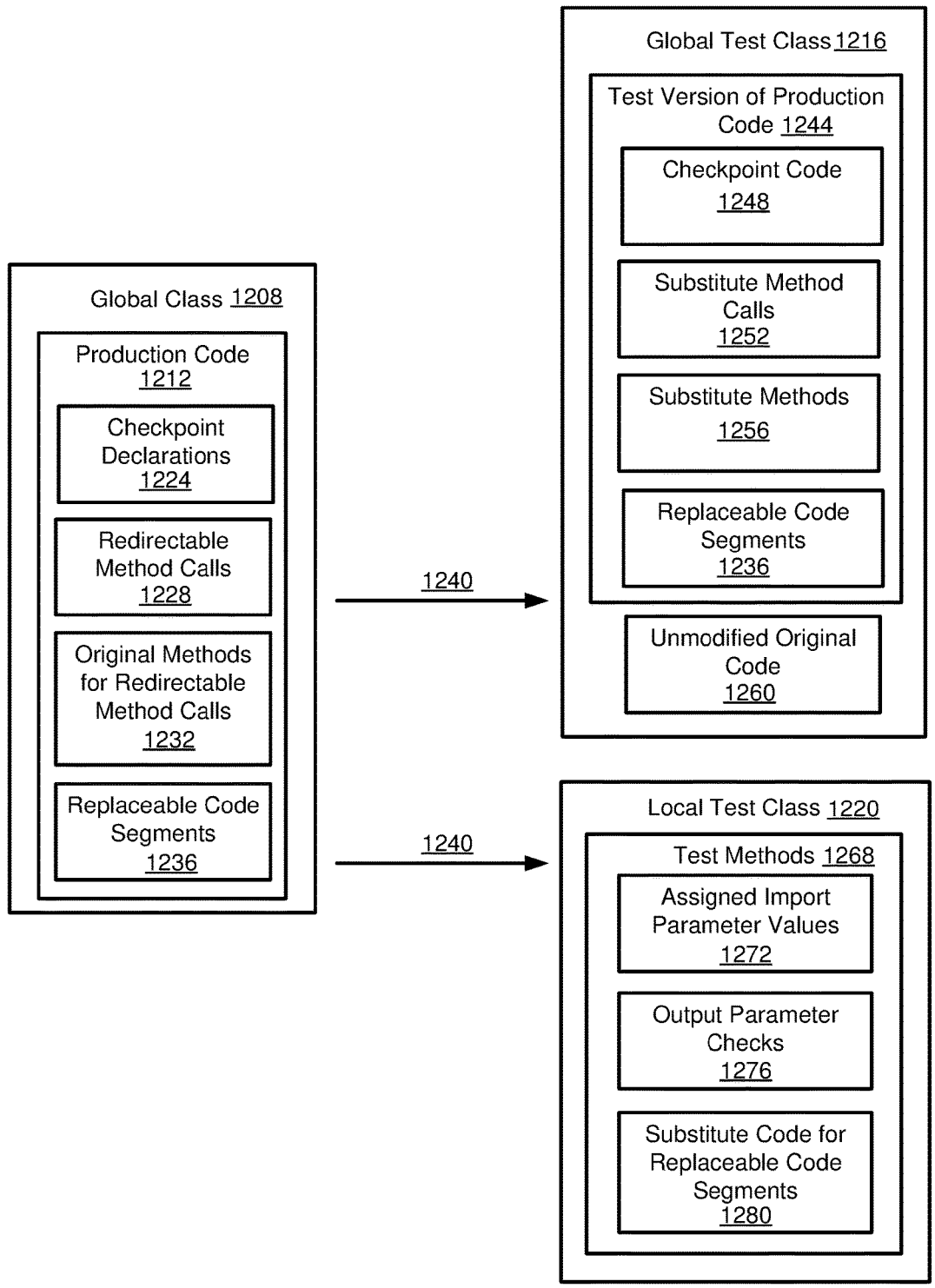
FIG. 12 is a block diagram illustrating how disclosed technologies can produce global and local test classes from a global class that contains productions code.

In at least some aspects, test code can be maintained separately from production code. FIG. 12 illustrates how a global class 1208 that contains production code 1212 can be processed according to disclosed technologies to produce a global test class 1216 and a local test class 1220.

The global class 1208 typically contains only production code, although it may include code, such as declarations, that can be used to generate the global test class 1216 and the local test class 1220. The production code 1212 can include code checkpoint declarations 1224, redirectable method calls 1228, methods 1232 originally called by the redirectable method calls 1228, and replaceable code segments 1236.

After processing 1240, such as using the computing environment 1100 of FIG. 11, the global test class 1216 is produced as a class separate from the global class 1208. The global test class 1216 can include a test version 1244 of the production code 1212. In the test version 1244 of the production code, one or more of the checkpoint declarations 1224 (if they were present in the production code 1212) can be replaced (or augmented) by checkpoint code 1248 (e.g., an assertion and optionally a value to be tested).

If present in the production code 1212, one or more of the redirectable method calls 1228 can be replaced by substitute method calls 1252. The global test class 1216 can also contain substitute methods 1256 for the substitute method calls. In at least some cases, replaceable code segments 1236 remain present in the test version 1244 of the production code. In other cases, the replaceable code segments 1236 can be replaced with substitute code in the test version of the production code. The global test class 1216 can include some code 1260 that represents production code 1212 that was not modified from the global class 1208. The code 1260 can include original methods 1232 called by redirectable method calls 1228.

The processing 1240 can also create the (or multiple) local test class 1220. The local test class 1220 can include one or more test methods 1268 (such as for methods of the production code 1212). The test methods 1268 can include assigned input parameter values 1272 (e.g., values entered via the screen 600 of FIG. 6). The test methods 1268 can include output (export) parameter checks 1276, which may include values and operators 1232 entered in the screen 700 of FIG. 7. For any activated replaceable code segments 1236, the local test class 1220 can include substitute code 1280, such as code entered via the screen 800 of FIG. 8. During test execution, the substitute code 1280 can be executed in place of the original code of the replaceable code segments 1236.

EXAMPLE 6

Example Process for Producing Test Code

Figure 13:
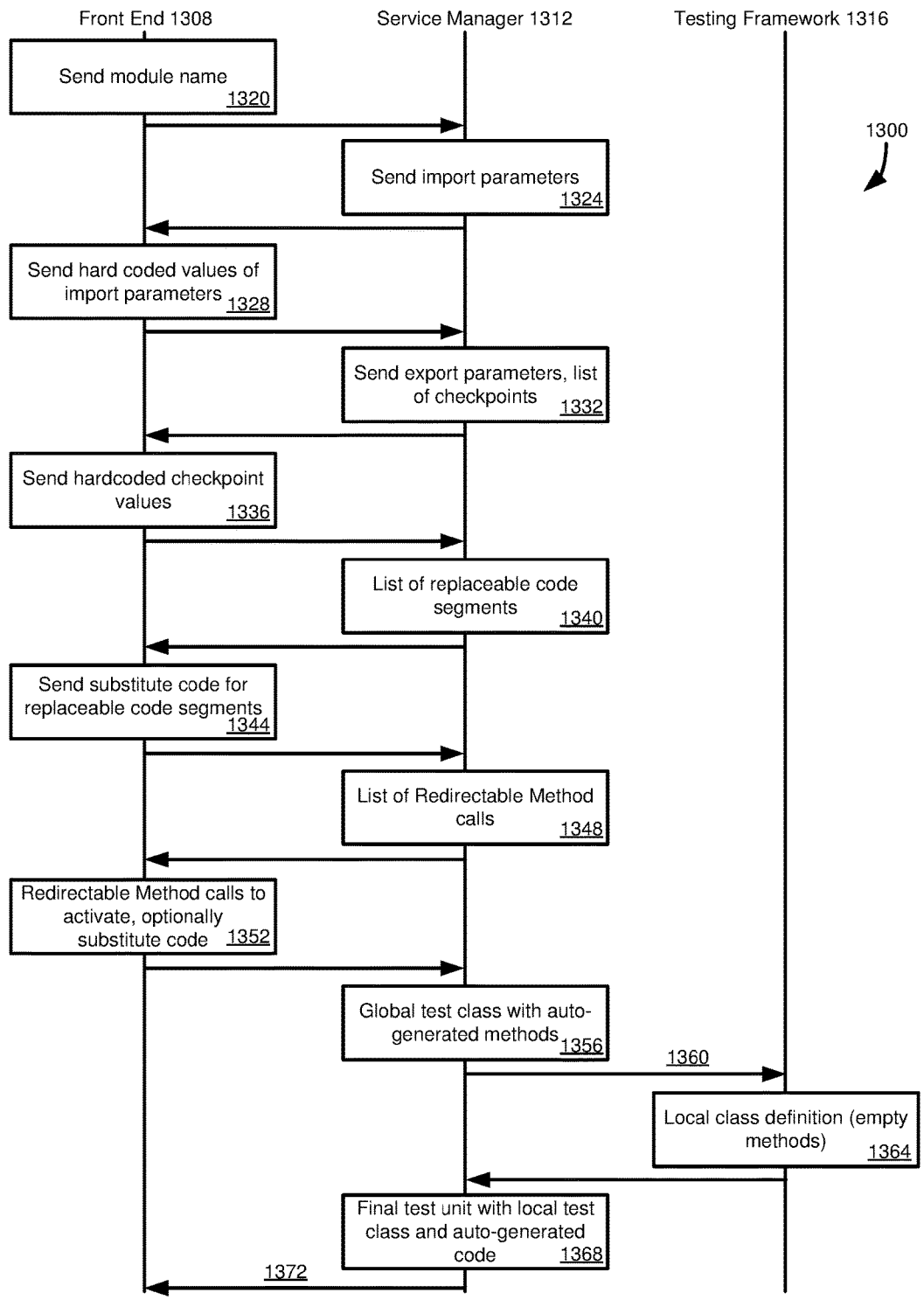
FIG. 13 depicts a process for generating test code according to an embodiment of the present disclosure.

FIG. 13 illustrates a process 1300 for converting production code, such as a global class, to a global test class and one or more local test classes. The process 1300 can represent the processing 1240 of FIG. 12, and can be carried out using the computing environment 1100 of FIG. 11.

The process 1300 is executed by a front end component 1308 (e.g., the front end 1110 of FIG. 11), a service manager 1312 (e.g., the service manager 1114), and a testing framework 1316 (e.g., the testing framework 1118). At 1320, such as in response to user input, the front end 1308 sends a production module (e.g., global or local class) identifier (such as a name or location) to the service manager 1312. The service manager 1312, at 1324 sends import parameters used by the production code module to the front end 1308. At 1328, the front end 1308 sends to the service manager 1312 hard coded values for the input parameters, such as in response to user input (e.g., through the screen 600 of FIG. 6).

The service manager 1312, at 1332, sends export parameters and code checkpoint identifiers to the front end 1308. At 1336, the front end 1308 sends checkpoint values (e.g., assertions or operators and, optionally, values) and export parameters checks (e.g., assertions or operators and, optionally, values) to the service manager 1312, such as in response to user input (e.g., through the screen 700 of FIG. 7). The service manager 1312, at 1340, sends a list of replaceable code segment identifiers to the front end 1308. At 1344, the front end 1308 sends substitute code for replaceable code segments to the service manager 1312, such as in response to user input (e.g., through the screen 800 of FIG. 8). The service manager 1312, at 1348, sends a list of redirectable method calls to the front end 1308. At 1352, the front end 1308 sends identifiers of redirectable method calls to be activated, optionally including code for substitute method to be generated, to the service manager 1312, such as in response to user input (e.g., using the screen 900 of FIG. 9).

At 1356, the service manager 1312 generates a global test class with checkpoint code, substitute method calls, and substitute method. The global test class can be the global test class 1216 of FIG. 12. The service manager 1312 calls the testing framework 1316 at 1360. At 1364, the testing framework 1316 creates an empty test class, such as the local test class 1220 of FIG. 12, and sends the empty test class (or an identifier thereof, or makes the empty test class available) to the service manager 1312. The service manager 1312, at 1368, populates the local test class with import parameter values received from the front end 1312 at 1328, export parameter assertions and values received at 1336, and substitute code segments received at 1344. The local and global test classes are made available to the front end 1308 by the service manager 1312 at 1372.

In some cases, the testing framework 1316 can be omitted. For example, the service manager 1312 may provide functionality for generating empty local test classes at 1364. However, the present disclosure is adapted to be used with existing testing frameworks, or independently of such frameworks.

EXAMPLE 7

Example Generation of Test Code Using User Interface

FIG. 14 is a flowchart of a method 1400 of generating test code from production code having one or more test code identifiers. The method 1400 can be carried out, in some examples, using the computing environment 1100 of FIG. 11.

At 1410, production code is provided having one or more test code indicators, or identifiers. A test code indicator can designate, for example, a code checkpoint, a redirectable method call, or replaceable code segment. The production code is scanned at 1420 to identify the one or more test code indicators. For example, code can be scanned for particular keywords or tokens. At 1430, identifiers of the identified one or more test code indicators are displayed to a user, such as through a user interface, which can be part of a wizard. User input is received at 1440 to activate test code associated with at least one test code indicator. The user input can also include values, operators, or code to be used in test code. At 1450, a test version of the production code is automatically generated. The test version of the test code comprises test code for the at least one test code indicator.

EXAMPLE 8

Example Test Code Generation Having Checkpoint Code

FIG. 15 is a flowchart of a method 1500 of producing a test version of production code, having checkpoint code. The method 1500 can be carried out, in some examples, using the computing environment 1100 of FIG. 11.

At 1510, user input is received defining production code. The production code includes at least one checkpoint identifier. The production code is scanned at 1520 to identify the at least one identifier. For example, code can be scanned for particular keywords or tokens. At 1530, the at least one identifier is displayed to a user through a user interface. User input is received at 1540 selecting at least one operator to be used at the code checkpoint associated with the at least one identifier. At 1550, a test version of the production code is automatically generated. The test version of the production code include code applying the at least one operator to at least one value produced by the test version of the production code.

EXAMPLE 9

Example Test Code Generation Having Substitute Method Call

FIG. 16 is a flowchart of a method 1600 of producing a test version of production code, having a substitute method call for a redirectable method call in the production code. The method 1600 can be carried out, in some examples, using the computing environment 1100 of FIG. 11.

At 1610, user input is received defining production code. The production code includes at least one identifier of a redirectable method call. The production code is scanned at 1620 to detect the at least one identifier. For example, code can be scanned for particular keywords or tokens. At 1630, the at least one identifier is displayed to a user through a user interface. User input is received at 1640 to activate test code for the redirectable method call associated with the at least one identifier. At 1650, a test version of the production code is automatically generated. The test version of the production code includes a substitute method call for the redirectable method call.

EXAMPLE 10

Example Test Code Generation Having Replaceable Code Segment

Figure 17:
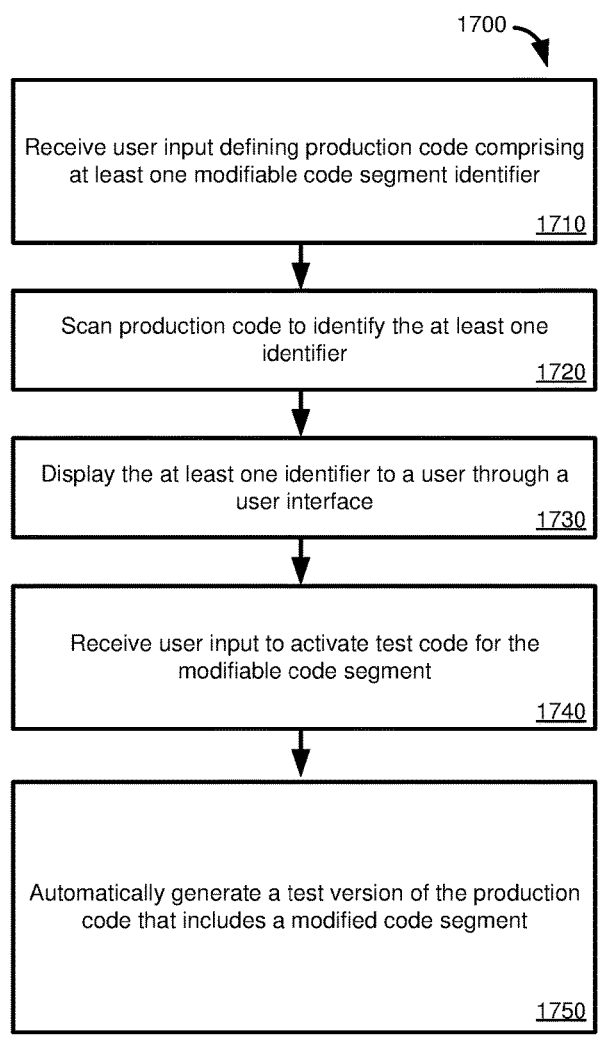
FIG. 17 is a flowchart illustrating operations in a method of generating a test version of production code that contains one or more modifiable code segments.

FIG. 17 is a flowchart of a method 1700 of producing a test version of production code, having one or more modified (or replaced) code segments for one or more modifiable code segments, such as replaceable code segments or redirectable method calls, in the production code. The method 1700 can be carried out, in some examples, using the computing environment 1100 of FIG. 11.

At 1710, user input is received defining production code. The production code includes at least one identifier of a modifiable code segment. The production code is scanned at 1720 to detect the at least one identifier. For example, code can be scanned for particular keywords or tokens. At 1730, the at least one identifier is displayed to a user through a user interface. User input is received at 1740 to activate test code for the modifiable code segment associated with the at least one identifier. The user input can include a piece of replacement code. At 1750, a test version of the production code is automatically generated. The test version of the production code includes a modified (or replaced) code segment, which could be a substitute method call or a replacement code segment.

EXAMPLE 11

Computing Systems

Figure 18:
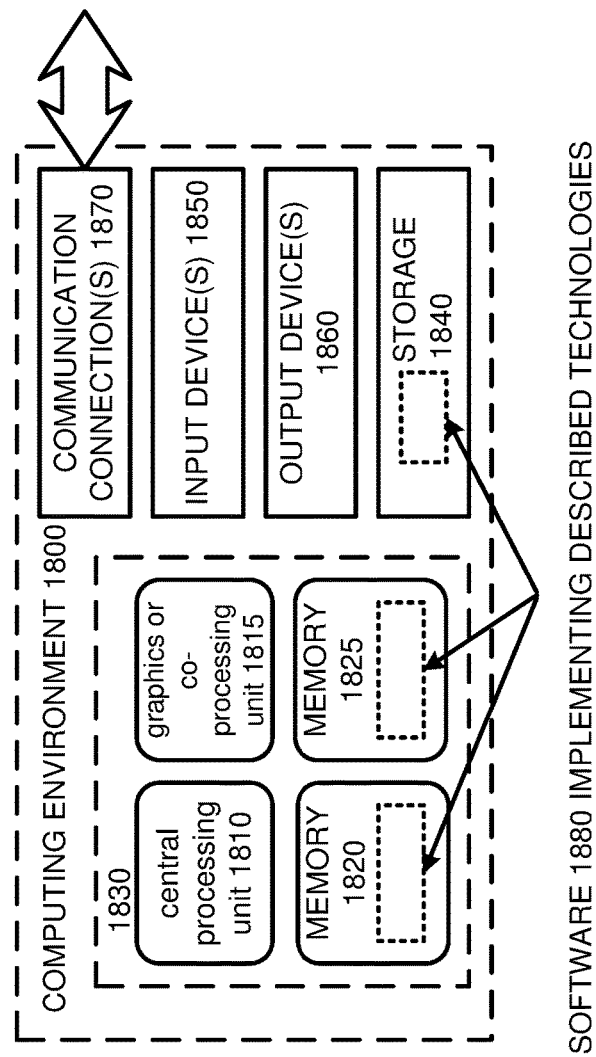
FIG. 18 is a diagram of an example computing system in which some described embodiments can be implemented.

FIG. 18 depicts a generalized example of a suitable computing system 1800 in which the described innovations may be implemented. The computing system 1800 is not intended to suggest any limitation as to scope of use or functionality of the present disclosure, as the innovations may be implemented in diverse general-purpose or special-purpose computing systems.

With reference to FIG. 18, the computing system 1800 includes one or more processing units 1810, 1815 and memory 1820, 1825. In FIG. 18, this basic configuration 1830 is included within a dashed line. The processing units 1810, 1815 execute computer-executable instructions, such as for implementing components of the architecture 1100 of FIG. 11, including as further described in Examples 1-10. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 18 shows a central processing unit 1810 as well as a graphics processing unit or co-processing unit 1815. The tangible memory 1820, 1825 may be volatile memory (e.g., registers, cache, RAM), non-volatile memory (e.g., ROM, EEPROM, flash memory, etc.), or some combination of the two, accessible by the processing unit(s) 1810, 1815. The memory 1820, 1825 stores software 1880 implementing one or more innovations described herein, in the form of computer-executable instructions suitable for execution by the processing unit(s) 1810, 1815.

A computing system 1800 may have additional features. For example, the computing system 1800 includes storage 1840, one or more input devices 1850, one or more output devices 1860, and one or more communication connections 1870. An interconnection mechanism (not shown) such as a bus, controller, or network interconnects the components of the computing system 1800. Typically, operating system software (not shown) provides an operating environment for other software executing in the computing system 1800, and coordinates activities of the components of the computing system 1800.

The tangible storage 1840 may be removable or non-removable, and includes magnetic disks, magnetic tapes or cassettes, CD-ROMs, DVDs, or any other medium which can be used to store information in a non-transitory way and which can be accessed within the computing system 1800. The storage 1840 stores instructions for the software 1880 implementing one or more innovations described herein.

The input device(s) 1850 may be a touch input device such as a keyboard, mouse, pen, or trackball, a voice input device, a scanning device, or another device that provides input to the computing system 1800. The output device(s) 1860 may be a display, printer, speaker, CD-writer, or another device that provides output from the computing system 1800.

The communication connection(s) 1870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

EXAMPLE 12

Cloud Computing Environment

Figure 19:
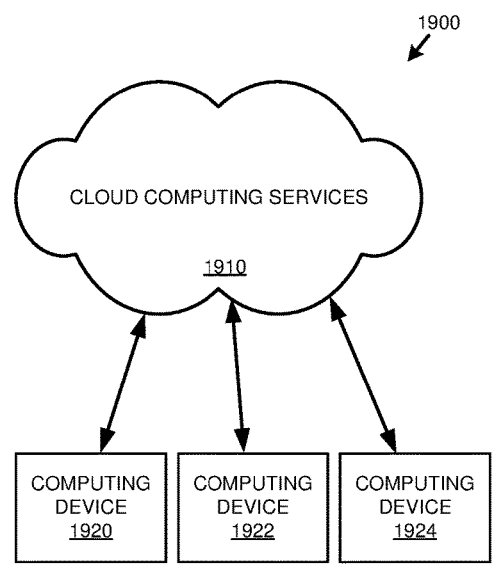
FIG. 19 is an example cloud computing environment that can be used in conjunction with the technologies described herein.

FIG. 19 depicts an example cloud computing environment 1900 in which the described technologies can be implemented. The cloud computing environment 1900 comprises cloud computing services 1910. The cloud computing services 1910 can comprise various types of cloud computing resources, such as computer servers, data storage repositories, networking resources, etc. The cloud computing services 1910 can be centrally located (e.g., provided by a data center of a business or organization) or distributed (e.g., provided by various computing resources located at different locations, such as different data centers and/or located in different cities or countries).

The cloud computing services 1910 are utilized by various types of computing devices (e.g., client computing devices), such as computing devices 1920, 1922, and 1924. For example, the computing devices (e.g., 1920, 1922, and 1924) can be computers (e.g., desktop or laptop computers), mobile devices (e.g., tablet computers or smart phones), or other types of computing devices. For example, the computing devices (e.g., 1920, 1922, and 1924) can utilize the cloud computing services 1910 to perform computing operators (e.g., data processing, data storage, and the like).

EXAMPLE 13

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 18, computer-readable storage media include memory 1820 and 1825, and storage 1840. The term computer-readable storage media does not include signals and carrier waves. In addition, the term computer-readable storage media does not include communication connections (e.g., 1870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, carried out in a computing system comprising a memory and one or more processors, the method comprising:
   providing production code comprising a plurality of lines of text, the plurality of lines of text comprising at least one line of text that comprises text declaring one or more test code indicators selected from the group consisting of (1) an identifier of a code checkpoint; (2) an identifier of a modifiable code segment indicating a replaceable code segment; and (3) an identifier of a modifiable code segment indicating a redirectable method call;
   scanning at least a first portion of the plurality of lines of text of the production code to identify the one or more test code indicators in the scanned at least a first portion of the plurality of lines of text;
   displaying the identifiers of the one or more test code indicators to a user through a user interface;
   receiving user input to activate test code associated with at least one of the one or more test code indicators; and
   automatically generating a test version of the production code, the test version of the production code comprising at least a second portion of the plurality of lines of text of the production code and at least a portion of one or more lines of test code text, corresponding to the test code for the at least one test code indicator, inserted into the at least a second portion of the plurality of lines of text of the production code;
   wherein the automatically generating a test version of the production code comprises one or more of:
   (1) the one or more test code indicators comprise the identifier of a code checkpoint and, in response to receiving user input to activate test code for the code checkpoint identifier, checkpoint code is inserted into the at least a second portion of the plurality of lines of text of the production code at a position indicated by the code checkpoint identifier;
   (2) the one or more test code indicators comprise the identifier of a modifiable code segment indicating a replaceable code segment and, in response to receiving user input to activate test code for the replaceable code segment, test code for the replacement code segment is inserted into the at least a second portion of the plurality of lines of text of the production code at a position indicated by a corresponding indicator of the modifiable code segment; or
   (3) the one or more test code indicators comprise the identifier of a modifiable code segment indicating a redirectable method call and, in response to receiving user input to activate test code for the redirectable method call, a substitute method call is inserted into the at least a second portion of the plurality of lines of text of the production code to replace the redirectable method call and a substitute method to be called by the substitute method call is created.

2. A computing system that implements a test code generation system, the computing system comprising:
   memory;
   one or more processors coupled to the memory; and
   one or more computer readable storage media storing computer-executable instructions capable of causing operations to be performed for:
   providing production code comprising a plurality of lines of text, the plurality of lines of text comprising at least one line of text that comprises text declaring one or more test code indicators selected from the group consisting of (1) an identifier of a code checkpoint; (2) an identifier of a modifiable code segment indicating a replaceable code segment; and (3) an identifier of a modifiable code segment indicating a redirectable method call;
   scanning at least a first portion of the plurality of lines of text of the production code to identify the one or more test code indicators in the scanned at least a first portion of the plurality of lines of text;
   displaying the identifiers of the one or more test code indicators to a user through a user interface;
   receiving user input to activate test code associated with at least one of the one or more test code indicators; and
   automatically generating a test version of the production code, the test version of the production code comprising at least a second portion of the plurality of lines of text of the production code and at least a portion of one or more lines of test code text, corresponding to the test code for the at least one test code indicator, inserted into the at least a second portion of the plurality of lines of text of the production code;
   wherein the automatically generating a test version of the production code comprises one or more of:
   (1) the one or more test code indicators comprise the identifier of a code checkpoint and, in response to receiving user input to activate test code for the code checkpoint identifier, checkpoint code is inserted into the at least a second portion of the plurality of lines of text of the production code at a position indicated by the code checkpoint identifier;
   (2) the one or more test code indicators comprise the identifier of a modifiable code segment indicating a replaceable code segment and, in response to receiving user input to activate test code for the replaceable code segment, test code for the replacement code segment is inserted into the at least a second portion of the plurality of lines of text of the production code at a position indicated by a corresponding indicator of the modifiable code segment; or
   (3) the one or more test code indicators comprise the identifier of a modifiable code segment indicating a redirectable method call and, in response to receiving user input to activate test code for the redirectable method call, a substitute method call is inserted into the at least a second portion of the plurality of lines of text of the production code to replace the redirectable method call and a substitute method to be called by the substitute method call is created.

3. One or more computer-readable storage media storing computer-executable instructions for causing a computing system to perform processing to generate a test version of production code, the processing comprising:

computer-executable instructions capable of providing production code comprising a plurality of lines of text, the plurality of lines of text comprising at least one line of text that comprises text declaring one or more test code indicators selected from the group consisting of (1) an identifier of a code checkpoint; (2) an identifier of a modifiable code segment indicating a replaceable code segment; and (3) an identifier of a modifiable code segment indicating a redirectable method call;

computer-executable instructions capable of scanning at least a first portion of the plurality of lines of text of the production code to identify the one or more test code indicators in the scanned at least a first portion of the plurality of lines of text;

computer-executable instructions capable of displaying the identifiers of the one or more test code indicators to a user through a user interface;

computer-executable instructions capable of receiving user input to activate test code associated with at least one of the one or more test code indicators; and computer-executable instructions capable of automatically generating a test version of the production code, the test version of the production code comprising at least a second portion of the plurality of lines of text of the production code and at least a portion of one or more lines of test code text, corresponding to the test code for the at least one test code indicator, inserted into the at least a second portion of the plurality of lines of text of the production code;

wherein the automatically generating a test version of the production code comprises one or more of:

(1) the one or more test code indicators comprise the identifier of a code checkpoint and, in response to receiving user input to activate test code for the code checkpoint identifier, checkpoint code is inserted into the at least a second portion of the plurality of lines of text of the production code at a position indicated by the code checkpoint identifier;

(2) the one or more test code indicators comprise the identifier of a modifiable code segment indicating a replaceable code segment and, in response to receiving user input to activate test code for the replaceable code segment, the test code for the replacement code segment is inserted into the at least a second portion of the plurality of lines of text of the production code at a position indicated by a corresponding indicator of the modifiable code segment; or (3) the one or more test code indicators comprise the identifier of a modifiable code segment indicating a redirectable method call and, in response to receiving user input to activate test code for the redirectable method call, a substitute method call is inserted into the at least a second portion of the plurality of lines of text of the production code to replace the redirectable method call and a substitute method to be called by the substitute method call is created.

4. The one or more computer-readable storage media of claim 3, wherein the declaring one or more test code indicators comprises selecting the code checkpoint identifier from the group.

5. The one or more computer-readable storage media of claim 3, wherein the user input comprises selecting at least one operator to apply at the code checkpoint.

6. The one or more computer-readable storage media of claim 5, wherein the user input further comprises selecting at least one value to be used with the selected at least one operator.

7. The one or more computer readable storage media of claim 6, wherein automatically generating a test version of the production code comprises inserting the checkpoint code, the checkpoint code comprising the operator.

8. The one or more computer-readable storage media of claim 3, wherein the declaring one or more test code indicators comprises selecting the identifier of a replaceable code segment from the group.

9. The one or more computer-readable storage media of claim 8, wherein the user input comprises at least a portion of the test code for the replaceable code segment.

10. The one or more computer-readable storage media of claim 3, further comprising:
computer-executable instructions capable of replacing code identified by the identifier of the replaceable code segment with the test code for the replaceable code segment.

11. The one or more computer-readable storage media of claim 3, wherein the declaring one or more test code indicators comprises selecting the identifier of a redirectable method call from the group.

12. The one or more computer-readable storage media of claim 11, wherein automatically generating a test version of the production code comprises replacing the redirectable method call with the substitute method call.

13. The one or more computer-readable storage media of claim 11, wherein the user input comprises a code segment and automatically generating the test version of the production code comprises inserting the code segment in the substitute method.

14. The one or more computer-readable storage media of claim 3, wherein the one or more test code indicators comprise an identifier of an import parameter and the user input comprises a value for the import parameter.

15. The one or more computer-readable storage media of claim 14, wherein automatically generating a test version of the production code comprises generating a test method comprising the value for the import parameter.

16. The one or more computer-readable storage media of claim 3, wherein the one or more test code indicators comprise an identifier of an export parameter.

17. The one or more computer-readable storage media of claim 16, wherein the user input comprises selecting at least one operator for the export parameter and automatically generating the test version of the production code comprises generating a test method comprising code applying the operator to the export parameter.

18. The one or more computer-readable storage media of claim 3, wherein the displaying and receiving are displayed as part of a test code generation wizard.

19. The one or more computer-readable storage media of claim 3, wherein the test version of the production code is separate from the production code.

20. The one or more computer-readable storage media of claim 3, further comprising:
computer-executable instructions capable of creating a global test class comprising first automatically generated test code and a local test class comprising second automatically generated test code.

* * * * *